US012270557B2

(12) United States Patent
Lee et al.

(10) Patent No.: US 12,270,557 B2
(45) Date of Patent: Apr. 8, 2025

(54) VENTILATION SYSTEM AND METHOD FOR CONTROLLING THE SAME

(71) Applicant: SAMSUNG ELECTRONICS CO., LTD., Suwon-si (KR)

(72) Inventors: Donggyu Lee, Suwon-si (KR); Kyunghoon Kim, Suwon-si (KR); Sunggoo Kim, Suwon-si (KR); Hyeongjoon Seo, Suwon-si (KR); Changmin Seok, Suwon-si (KR); Jaehyoung Sim, Suwon-si (KR); Eomji Jang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 207 days.

(21) Appl. No.: 17/992,256

(22) Filed: Nov. 22, 2022

(65) Prior Publication Data
US 2023/0213227 A1    Jul. 6, 2023

Related U.S. Application Data

(63) Continuation of application No. PCT/KR2022/017283, filed on Nov. 4, 2022.

(30) Foreign Application Priority Data

Jan. 4, 2022    (KR) .................. 10-2022-0000804

(51) Int. Cl.
*F24F 11/00*    (2018.01)
*F24F 7/08*    (2006.01)
(Continued)

(52) U.S. Cl.
CPC ............ *F24F 11/0001* (2013.01); *F24F 7/08* (2013.01); *F24F 12/006* (2013.01); *F24F 2013/221* (2013.01); *F24F 2221/22* (2013.01)

(58) Field of Classification Search
CPC ........ F24F 11/0001; F24F 7/08; F24F 12/006; F24F 2013/221; F24F 2013/225;
(Continued)

(56) References Cited

U.S. PATENT DOCUMENTS

2002/0139514 A1    10/2002    Lagace et al.
2008/0156454 A1*    7/2008    Kim .................. F24F 13/30
                                                                    165/59
2020/0200413 A1    6/2020    Horie et al.

FOREIGN PATENT DOCUMENTS

JP    2019-508656    3/2019
JP    6479210    3/2019
(Continued)

OTHER PUBLICATIONS

English translation of Lee (KR 20210155403 A) (Year: 2021).*
(Continued)

*Primary Examiner* — Miguel A Diaz
(74) *Attorney, Agent, or Firm* — STAAS & HALSEY LLP

(57) ABSTRACT

A ventilation system including a ventilator and a processor. The ventilator includes a housing, first intake, second intake, first outlet, second outlet, dampers, first air blower, second air blower, total heat exchanger, and heat exchanger. The processor is configured to change the air flow path of air flowing through the housing from an intake flow path and discharge flow path while in a ventilation mode to a heat exchanger cleaning mode or a total heat exchanger drying mode, in which air in the room flows into the housing through the first outlet, passes through the heat exchanger and then the total heat exchanger, and is discharged to the space outside the room through the second outlet.

15 Claims, 17 Drawing Sheets

(51) Int. Cl.
*F24F 12/00* (2006.01)
*F24F 13/22* (2006.01)

(58) Field of Classification Search
CPC ............. F24F 2221/22; F24F 2221/225; F24F 2011/0002; F24F 13/222
See application file for complete search history.

(56) References Cited

FOREIGN PATENT DOCUMENTS

| | | |
|---|---|---|
| KR | 10-1790696 | 10/2017 |
| KR | 10-2018-0135636 | 12/2018 |
| KR | 10-2019-0050211 | 5/2019 |
| KR | 10-2060633 | 12/2019 |
| KR | 10-2020-0079060 | 7/2020 |
| KR | 10-2020-0109528 | 9/2020 |
| KR | 10-2021-0011976 | 2/2021 |
| KR | 10-2314183 | 10/2021 |
| KR | 10-2327427 | 11/2021 |
| KR | 10-2021-0155403 | 12/2021 |
| KR | 10-2357140 | 2/2022 |
| KR | 10-2507590 | 3/2023 |

OTHER PUBLICATIONS

English translation of Choi (KR 102327427 B1) (Year: 2021).*
International Search Report, PCT/ISA/210, dated Feb. 22, 2023, in PCT Application No. PCT/KR2022/017283.
Written Opinion, PCT/ISA/237, dated Feb. 22, 2023, in PCT Application No. PCT/KR2022/017283.
Supplementary European Search Report dated Oct. 11, 2024 issued in European Application No. EP 22 91 8991.

* cited by examiner

VENTILATION SYSTEM AND METHOD FOR CONTROLLING THE SAME

CROSS-REFERENCE TO RELATED APPLICATIONS

This application is a continuation application of International Application No. PCT/KR2022/017283 designating the United States, filed on Nov. 4, 2022, in the Korean Intellectual Property Receiving Office and claiming priority to Korean Patent Application No. 10-2022-0000804 filed on Jan. 4, 2022, in the Korean Intellectual Property Office, the disclosures of which are incorporated by reference herein in their entireties.

BACKGROUND

1. Field

The disclosure relates to a ventilation system and method for controlling the same to provide pleasant air into indoor space.

2. Description of Related Art

A ventilation system is an apparatus for ventilating indoor space by supplying outside air into the indoor space or exchanging room air with outside air. The traditional ventilator has no choice but to control room temperature and humidity by only total heat exchange between outside air and room air, which takes place while the air is passing a total heat exchanger. This leads to incomplete dehumidification of the outside air supplied indoors and makes it difficult to maintain the room temperature and humidity in a pleasant state.

Furthermore, as the use of the ventilator increases these days when quality, hygiene and cleanliness of room air are highlighted, there is a growing interest in the issues of contamination of the inside of the ventilator. Accordingly, a method of cleaning inside of the ventilator is required.

SUMMARY

According to an embodiment, there is disclosed a ventilation system including: a ventilator including: a housing including a first intake, a second intake, a first outlet and a second outlet, a plurality of dampers configured to change an air flow path of air flowing through the housing, a first air blower, a second air blower, a total heat exchanger inside the housing, and a heat exchanger inside the housing; and a processor configured to control the first air blower, the second air blower, and the plurality of dampers to change the air flow path of air flowing through the housing so as to provide: a ventilation mode in which: an intake flow path is provided in which the first air blower causes air from a space outside a room to enter the housing through the first intake, thereafter pass through the total heat exchanger, thereafter pass through the heat exchanger, and thereafter be discharged into the room through the first outlet, and a discharge flow path is provided in which the second air blower causes air from the room to enter the housing through the second intake, thereafter pass through the total heat exchanger, and thereafter be discharged to the space outside the room through the second outlet, without passing through the heat exchanger, and at least one of a heat exchanger cleaning mode and a total heat exchanger drying mode, in which the first air blower is stopped, and the second air blower and the plurality of dampers are operated to cause air in the room to flow into the housing through the first outlet, thereafter pass through the heat exchanger, thereafter pass through the total heat exchanger, and thereafter be discharged to the space outside the room through the second outlet.

The plurality of dampers may include: a first damper configured to open and close the first intake, and a second damper configured to open and close a connection flow path between the first intake and the second intake, wherein the processor is configured to provide the at least one of a heat exchanger cleaning mode and a total heat exchanger drying mode by: controlling the first damper to close the first intake, and controlling the second damper to open the connection flow path between the first intake and the second intake.

The plurality of dampers may include: a third damper configured to open and close the second intake, wherein the processor is configured to provide the at least one of a heat exchanger cleaning mode and a total heat exchanger drying mode, by: controlling the third damper to close the second intake.

The ventilation system may include an outdoor unit configured to supply a refrigerant to the ventilator, wherein the processor is configured to provide the heat exchanger cleaning mode by: operating the outdoor unit to form frost on the heat exchanger, and, after the frost is formed on the heat exchanger, stopping the outdoor unit to defrost the heat exchanger.

The outdoor unit may include: an outdoor heat exchanger; a compressor configured to compress the refrigerant; and a four-way valve configured to switch a circulation direction of the refrigerant, and wherein the processor is configured to, in the heat exchanger cleaning mode, control the compressor and the four-way valve to allow the refrigerant to pass from the compressor to the outdoor heat exchanger and to be supplied to the heat exchanger in the ventilator.

The outdoor unit may include: an outdoor heat exchanger; a compressor configured to compress the refrigerant; and a four-way valve configured to switch a circulation direction of the refrigerant, and wherein the processor is configured to, while operating in the total heat exchanger drying mode, control the compressor and the four-way valve to allow the refrigerant to pass from the compressor to the heat exchanger in the ventilator and to be supplied to the outdoor heat exchanger.

The processor may be configured to, in the total heat exchanger drying mode, control the outdoor unit to allow a hot gas discharged from the compressor to be supplied to the heat exchanger through a hot gas line.

The processor may be configured to: in the ventilation mode, operate the first air blower and the second air blower, and after the operation of the first air blower and the second air blower is completed, operate the ventilation system in the at least one of the heat exchanger cleaning mode and the total heat exchanger drying mode.

The processor may be configured to: in the ventilation mode, operate the first air blower and the second air blower for a preset threshold time, and thereafter operate the ventilation system in the heat exchanger cleaning mode.

The processor may be configured to: periodically operate the ventilator and the outdoor unit in the total heat exchanger mode based on a preset schedule.

According to an embodiment, there is disclosed a method of controlling a ventilation system including a ventilator and an outdoor unit for supplying a refrigerant to the ventilator, the ventilator including a housing that includes a first intake, a second intake, a first outlet, and a second outlet, a plurality of dampers configured to change an air flow path of air flowing through the housing, a first air blower, a second air blower, a total heat exchanger inside the housing, a heat exchanger inside the housing, and a processor, the method including, by the processor: controlling the first air blower, the second air blower, and the plurality of dampers to change the air flow path of air flowing through the housing so as to provide: a ventilation mode in which: an intake flow path is provided in which the first air blower causes air from a space outside a room to enter the housing through the first intake, thereafter pass through the total heat exchanger, thereafter pass through the heat exchanger, and thereafter be discharged into the room through the first outlet, and a discharge flow path is provided in which the second air blower causes air from the room to enter the housing through the second intake, thereafter pass through the total heat exchanger, and thereafter be discharged to the space outside the room through the second outlet, without passing through the heat exchanger, and at least one of a heat exchanger cleaning mode and a total heat exchanger drying mode, in which the first air blower is stopped, and the second air blower and the plurality of dampers are operated to cause air in the room to flow into the housing through the first outlet, thereafter pass through the heat exchanger, thereafter pass through the total heat exchanger, and thereafter be discharged to the space outside the room through the second outlet.

The plurality of dampers may include a first damper configured to open and close the first intake and a second damper configured to open and close a connection flow path between the first intake and the second intake, and, in the at least one of the heat exchanger cleaning mode and the total heat exchanger drying mode, the first damper may be controlled to close the first intake, and the second damper may be controlled to open the connection flow path.

The plurality of dampers may include a third damper configured to open and close the second intake, and, in the at least one of the heat exchanger cleaning mode and the total heat exchanger drying mode, the third damper may be controlled to close the second intake.

The ventilation system may include an outdoor unit configured to supply a refrigerant to the ventilator, and, in the heat exchanger cleaning mode, the outdoor unit may be operated to form frost on the heat exchanger, and, after the frost is formed on the heat exchanger, the outdoor unit may be stopped to defrost the heat exchanger.

The ventilation system may include a four-way valve, and, in the heat exchanger cleaning mode, a compressor in the outdoor unit and the four-way valve may be controlled to allow the refrigerant in the compressor to pass an outdoor heat exchanger in the outdoor unit, and thereafter be supplied to the heat exchanger in the ventilator.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
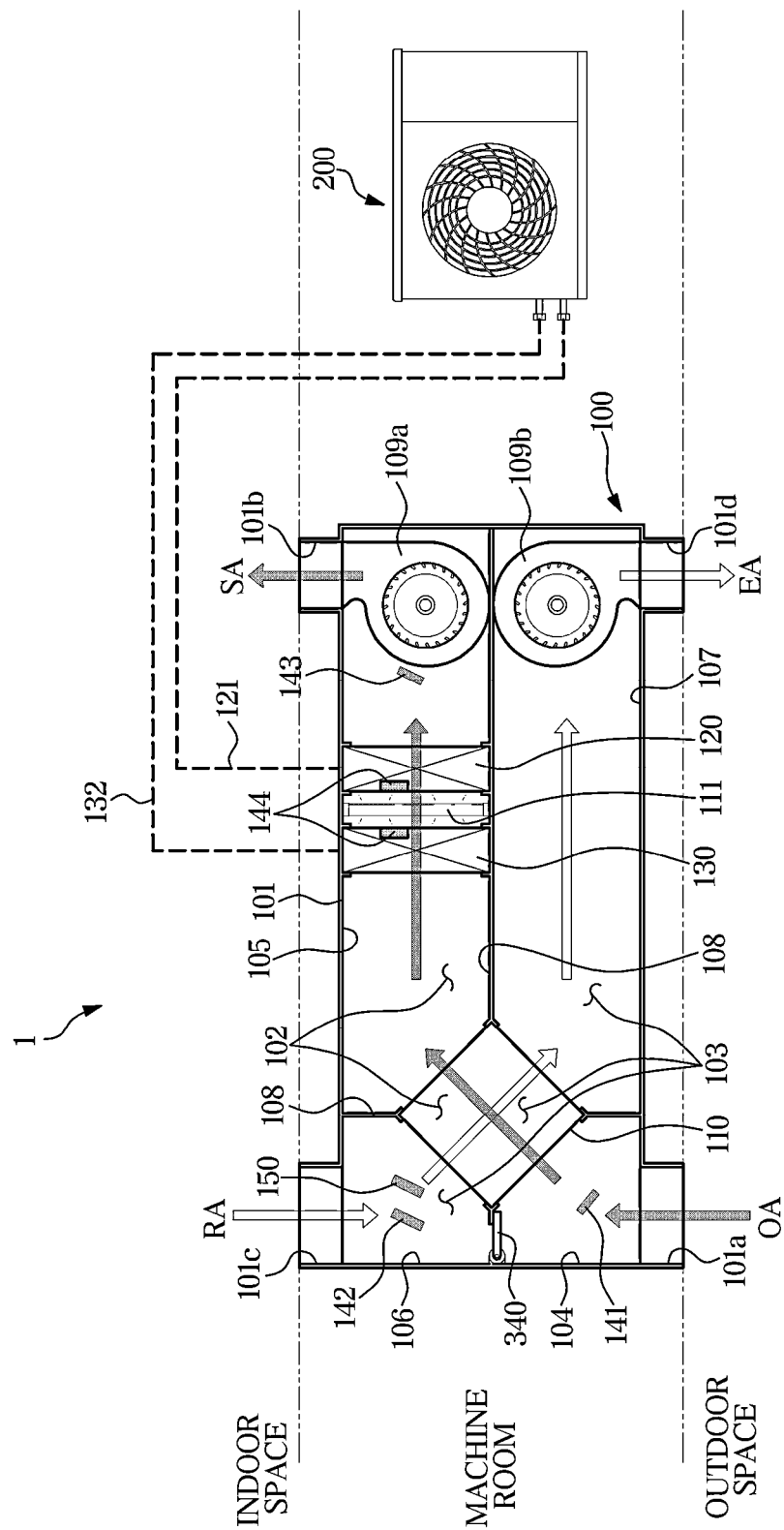
FIG. 1 illustrates a ventilation system including a ventilator, according to an embodiment.

One aspect of disclosure provides a ventilation system and method for controlling the same to clean a heat exchanger arranged in a ventilator. Another aspect of the disclosure provides a ventilation system and method for controlling the same to efficiently dry a total heat exchanger arranged in the ventilator.

A ventilation system and method for controlling the same as disclosed herein may clean a heat exchanger arranged in a ventilator by changing an air flow path and clean the heat exchanger without frosting an outlet of the ventilator. This may keep not only the inside of the ventilator but also the outlet of the ventilator clean.

The ventilation system and method for controlling the same may also efficiently dry a total heat exchanger arranged in the ventilator. This may prevent the total heat exchanger from going moldy, expand a lifespan of the total heat exchanger, and improve the quality of air supplied to an indoor space.

Embodiments and features as described and illustrated in the disclosure are merely examples, and there may be various modifications replacing the embodiments and drawings at the time of filing this application.

Throughout the drawings, like reference numerals refer to like parts or components. For the sake of clarity, the elements of the drawings are drawn with exaggerated forms and sizes.

It will be further understood that the term "connect" or its derivatives refer both to direct and indirect connection, and the indirect connection includes a connection over a wireless communication network.

The terminology used herein is for the purpose of describing particular embodiments only and is not intended to limit the present disclosure. It is to be understood that the singular forms "a," "an," and "the" include plural references unless the context clearly dictates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The terms including ordinal numbers like "first" and "second" may be used to explain various components, but the components are not limited by the terms. The terms are only for the purpose of distinguishing a component from another. Thus, a first element, component, region, layer or room discussed below could be termed a second element, component, region, layer or section without departing from the teachings of the disclosure. Descriptions shall be understood as to include any and all combinations of one or more of the associated listed items when the items are described by using the conjunctive term "~ and/or ~," or the like.

Furthermore, the terms, such as "~ part", "~ block", "~ member", "~ module", etc., may refer to a unit of handling at least one function or operation. For example, the terms may refer to at least one process handled by hardware such as field-programmable gate array (FPGA)/application specific integrated circuit (ASIC), etc., software stored in a memory, or at least one processor.

Reference numerals used for method steps are just used to identify the respective steps, but not to limit an order of the steps. Thus, unless the context clearly dictates otherwise, the written order may also be practiced otherwise.

Embodiments of the disclosure will now be described with reference to the accompanying drawings.

Figure 2:
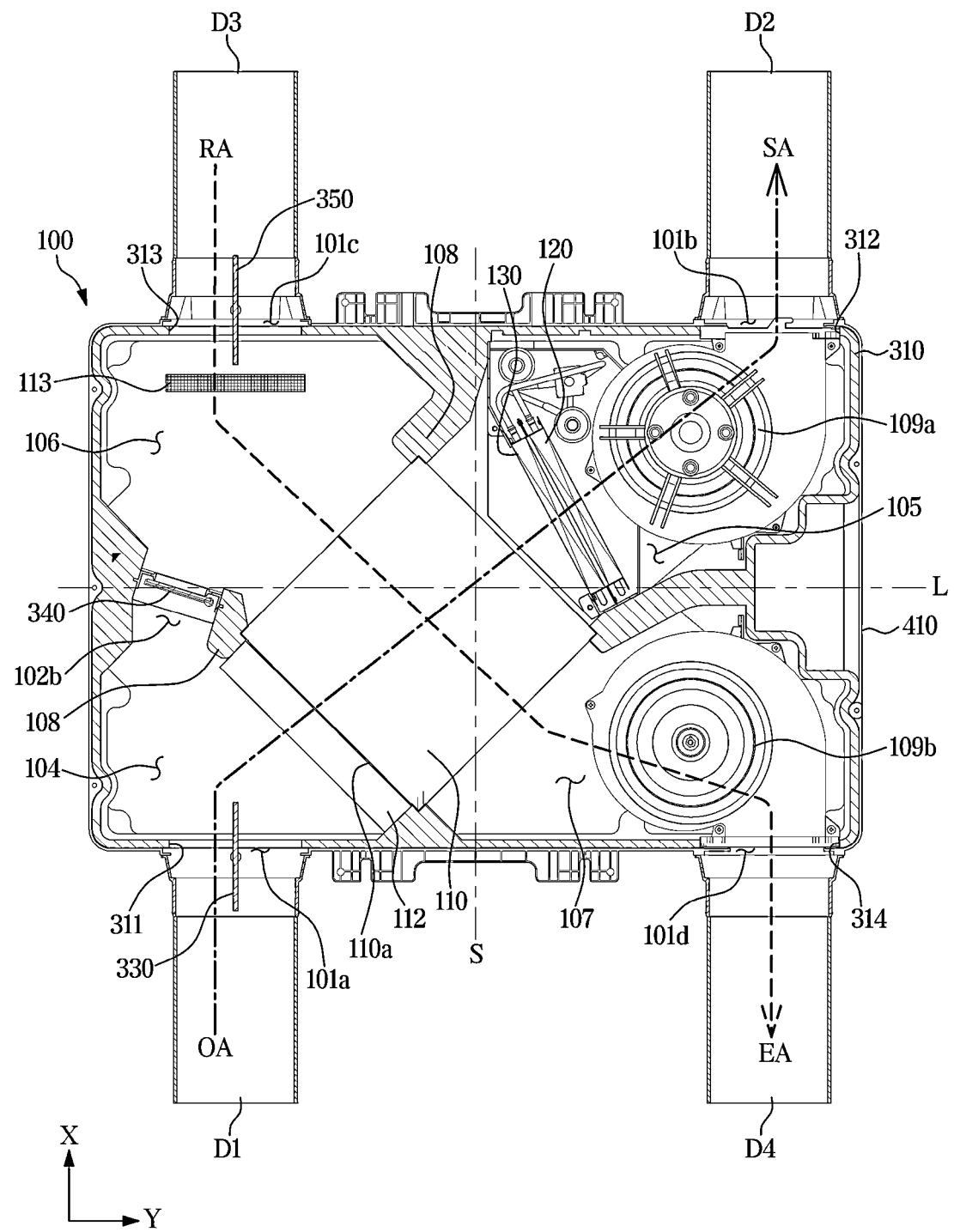
FIG. 2 is a plan view of inside of a ventilator viewed from above, according to an embodiment.

FIG. 1 illustrates a ventilation system including a ventilator, according to an embodiment. FIG. 2 is a plan view of inside of a ventilator viewed from above, according to an embodiment.

Referring to FIGS. 1 and 2, a ventilation system 1 may include a ventilator 100 connected to indoor space and outdoor space. The ventilation system 1 may also include an outdoor unit 200 for supplying a refrigerant to the ventilator 100. The ventilator 100 and the outdoor unit 200 may be installed in a machine room (e.g., a utility room in the house) differentiated from the outdoor space and the indoor space. There are no limitations on the place where the ventilator 100 and the outdoor unit 200 are installed.

The ventilator 100 may include a housing 101 that forms the external appearance. For example, the housing 101 may be shaped like a hexahedron. The housing 101 may include an intake flow path 102 that sucks in and guides outside air OA into the indoor space, and a discharge flow path 103 that guides room air RA to the outdoor space. The intake flow path 102 and the discharge flow path 103 may be separated by a plurality of partitions 108.

The housing 101 may include a first intake 101a connected to the outdoor space and formed to suck the outside air OA into the housing 101, a first outlet 101b connected to the indoor space and formed to discharge the outside air OA sucked into the housing 101 to the indoor space, and a first intake room 104 and a second intake room 105, which form the intake flow path 102. The intake flow path 102 may connect the first intake 101a to the first outlet 101b.

The housing 101 may include a second intake 101c connected to the indoor space and formed to suck the room air RA into the housing 101, a second outlet 101d connected to the outdoor space and formed to discharge the room air RA sucked into the housing 101 to the outdoor space, and a first discharge room 106 and a second discharge room 107, which form the discharge flow path 103. The discharge flow path 103 may connect the second intake 101c to the second outlet 101d.

The ventilator 100 may include a first duct D1 connected to the first intake 101a of the housing 101 and extending to the outdoor space, a second duct D2 connected to the first outlet 101b and extending to the indoor space, a third duct D3 connected to the second intake 101c and extending to the indoor space, and a fourth duct D4 connected to the second outlet 101d and extending to the outdoor space.

The ventilator 100 may include a first air blower 109a connected to the first outlet 101b in the second intake room 105, and a second air blower 109b connected to the second outlet 101d in the second discharge room 107. The first air blower 109a may create wind power required to discharge air through the first outlet 101b. The second air blower 109b may create wind power required to discharge air through the second outlet 101d. Specifically, when the first air blower 109a operates, the air in the housing 101 is discharged into the indoor space through the first outlet 101b. When the second air blower 109b operates, the air in the housing 101 is discharged to the outdoor space through the second outlet 101d.

The ventilator 100 may include a total heat exchanger 110 arranged to exchange heat between the outside air OA and the room air RA. When the ventilation system 1 operates in a ventilation mode, the air flowing in the discharge flow path 103 and the air flowing in the intake flow path 102 may exchange heat with each other in the total heat exchanger 110. During the ventilating operation of the ventilation system 1, the air discharged into the indoor space through the first outlet 101b may be referred to as supplied air SA, and the air discharged to the outdoor space through the second outlet 101d may be referred to as exhaust air EA.

The total heat exchanger 110 may be formed of a paper material coated with lithium chloride and may also be referred to as a total heat exchanging element. The total heat exchanger 110 may be implemented as a plate-type total heat exchanger or a rotary-type total heat exchanger. The total heat exchanger 110 may be placed at a point where the intake flow path 102 and the discharge flow path 103 cross. In other words, the total heat exchanger 110 is arranged in the intake flow path 102 and at the same time, in the discharge flow path 103.

The total heat exchanger 110 may connect the first intake room 104 to the second intake room 105. The total heat exchanger 110 may connect the first discharge room 106 to the second discharge room 107. During the ventilating operation of the ventilation system 1, the outside air OA flowing through the intake flow path 102 and the room air RA flowing through the discharge flow path 103 exchange heat in the total heat exchanger 110 without contact.

The ventilator 100 may include a filter 112 for capturing foreign materials contained in the outside air OA. The filter 112 may be arranged to be adjacent to the total heat exchanger 110. The total heat exchanger 110 may include an intake air inflow end 110a, and the filter 112 may be arranged to face the intake air inflow end 110a of the total heat exchanger 110.

It may be desirable for the filter 112 to be arranged to closely face the intake air inflow end 110a. Accordingly, the foreign materials contained in the outside air OA flowing in through the first intake 101a may be filtered out and prevent contamination of the total heat exchanger 110.

For example, the filter 112 may be a high efficiency particulate air (HEPA) filter. The HEPA filter may be comprised of glass fiber. The filter 112 may be provided as a photocatalytic filter that uses a photocatalyst to induce a chemical action of air. Specifically, the filter 112 may include a photocatalyst and induce a chemical reaction to light energy of the photocatalyst to capture various pathogens and bacteria present in the air. Acceleration of the chemical action may lead to decomposition, removal or capture of odor particles in the air. It is not, however, limited thereto, and many different types of filters capable of capturing foreign materials may be provided for the filter 112.

In the meantime, the traditional ventilator includes only a total heat exchanger for performing heat exchange between the outside air OA and the room air RA. The traditional ventilator is not connected to the outdoor unit. In other words, the traditional ventilator does not include an extra heat exchanger that receives the refrigerant from the outdoor unit. The traditional ventilator is only able to supply outside air into the indoor space and discharge room air to the outdoor space, and is unable to perform an extra dehumidifying function.

On the contrary, the ventilator 100 as disclosed herein may include heat exchangers 120 and 130 provided to regulate humidity and temperature of the air flowing in the intake flow path 102. The heat exchangers 120 and 130 may be referred to as a dehumidification module. The heat exchangers 120 and 130 may remove moisture contained in the air passing through the heat exchangers 120 and 130. As the moisture contained in the air is removed while passing through the heat exchangers 120 and 130, dry air may be supplied into the indoor space.

The heat exchangers 120 and 130 may include a first heat exchanger 120 and a second heat exchanger 130. The heat exchangers 120 and 130 may be arranged in the intake flow path 102. The heat exchangers 120 and 130 may be arranged in the second intake room 105. Specifically, the first heat exchanger 120 and the second heat exchanger 130 may be placed farther downstream in the intake flow path 102 than the total heat exchanger 110 is. The second heat exchanger 130 may be placed on a farther upstream side of the intake flow path 102 than the first heat exchanger 120 is. In other words, the first heat exchanger 120 may be placed on a farther downstream side of the intake flow path 102 than the second heat exchanger 130 is.

There are no limitations on the number of heat exchangers to be arranged in the ventilator 100. That is, the ventilator 100 may include at least one heat exchanger.

During the ventilating operation of the ventilation system 1, the outside air OA sucked in through the first intake 101*a* passes the first intake room 104, the total heat exchanger 110, the second heat exchanger 130, and the first heat exchanger 120 in sequence and is then discharged to the indoor space through the first outlet 101*b*. The room air RA sucked in through the second intake 101*c* passes the first discharge room 106 and the total heat exchanger 110 and is then discharged to the outdoor space through the second outlet 101*d*.

The air flowing in the intake flow path 102 from the first intake 101*a* to the first outlet 101*b* may be dehumidified by the second heat exchanger 130. Furthermore, the air that has passed the second heat exchanger 130 may be heated or cooled by the first heat exchanger 120.

The ventilator 100 may include an outside temperature sensor 141 for measuring a first temperature (outside temperature) of the outside air OA, a room temperature sensor 142 for measuring a second temperature (room temperature) of the room air RA, and a discharge temperature sensor 143 for measuring a discharge temperature of the supplied air SA discharged into the indoor space after passing through the heat exchangers 120 and 130. The ventilator 100 may also include a room humidity sensor 150 for measuring room humidity. The room humidity may mean relative humidity.

The outside temperature sensor 141 may be arranged in the intake flow path 102. For example, the outside temperature sensor 141 may be located in the first intake room 104 between the first intake 101*a* and the total heat exchanger 110. It is not limited thereto, and the outside temperature sensor 141 may also be located outside of the housing 101.

The room temperature sensor 142 and the room humidity sensor 150 may be arranged in the discharge flow path 103. The room temperature sensor 142 and the room humidity sensor 150 may be arranged in the first discharge room 106. The room temperature sensor 142 and the room humidity sensor 150 may be placed farther upstream in the discharge flow path 103 than the total heat exchanger 110 is.

The room temperature sensor 142 may measure temperature of the room air RA sucked in through the second intake 101*c*. The room humidity sensor 150 may measure humidity of the room air RA sucked in through the second intake 101*c*. It is not limited thereto, and the room temperature sensor 142 and the room humidity sensor 150 may also be located outside of the housing 101.

The discharge temperature sensor 143 may be arranged in the intake flow path 102. The discharge temperature sensor 143 may be arranged in the second intake room 105. The discharge temperature sensor 143 may be placed on a farther downstream side of the intake flow path 102 than the first and second heat exchangers 120 and 130 are. The discharge temperature sensor 143 may measure temperature of the supplied air SA discharged into the indoor space through the first outlet 101*b*. It is not, however, limited thereto, and the discharge temperature sensor 143 may also be located outside of the housing 101.

The ventilator 100 may also include a heat exchanger temperature sensor 144 for measuring temperature of the heat exchangers 120 and 130. The heat exchange temperature sensor 144 may be arranged on the surface of the heat exchangers 120 and 130. The heat exchange temperature sensor 144 may be provided to measure both temperatures of the first heat exchanger 120 and the second heat exchanger 130, or may be provided separately for each of the first heat exchanger 120 and the second heat exchanger 130.

The ventilator 100 may include a first sterilizer 111 for sterilizing the first heat exchanger 120 and the second heat exchanger 130. The first sterilizer 111 may be arranged between the first heat exchanger 120 and the second heat exchanger 130. The first sterilizer 111 may sterilize both the first heat exchanger 120 and the second heat exchanger 130 arranged on either side. The first sterilizer 111 may include an ultraviolet light source for irradiating an ultraviolet ray. For example, the first sterilizer 111 may include a UV light emitting diode (LED).

Furthermore, the ventilator 100 may include a second sterilizer 113 for sterilizing room air RA sucked in through the second intake 101*c*. The second sterilizer 113 may be placed in the first discharge room 106. For example, the second sterilizer 113 may include at least one of a heater, an infrared lamp, or a UV LED.

The housing 101 may include a connection flow path 102*b* that connects the first intake room 104 to the second intake room 106. The connection flow path 102*b* may be arranged between the first intake room 104 and the second intake room 106 and arranged on the partition 108 that separates the first intake room 104 and the second intake room 106. The connection flow path 102b may be formed by cutting at least a portion of the partition 108. When the connection flow path 102b is opened, the first intake 104 and the second intake 106 may be connected to each other.

The ventilator 100 may include a plurality of dampers arranged to change the air flow path formed in the housing 101. The plurality of dampers may open or close flow paths formed in the ventilator 100.

A first damper 330 may be arranged at the first intake 101a to open or close the first intake 101a. A second damper 340 may be arranged between a side of the total heat exchanger 110 and an inner wall of the housing 101. The second damper 340 may be arranged in the connection flow path 102b. The second damper 340 may open or close the connection flow path 102b formed between the first intake 101a and the second intake 101c. A third damper 350 may be arranged at the second intake 101c to open or close the second intake 101c. Under the control of a processor 193 as will be described later, respective opening degrees of the first damper 330, the second damper 340 and the third damper 350 may be controlled.

When the ventilation system 1 is operating in a ventilation mode, the first damper 330 arranged at the first intake 101a is opened, the third damper 350 arranged at the second intake 101c is opened, and the second damper 340 arranged in the connection flow path 102b is closed. Hence, the outside air OA sucked in through the first intake 101a is discharged into the indoor space through the first outlet 101b, and the room air RA sucked in through the second intake 101c is discharged to the outdoor space through the second outlet 101d.

Figure 3:
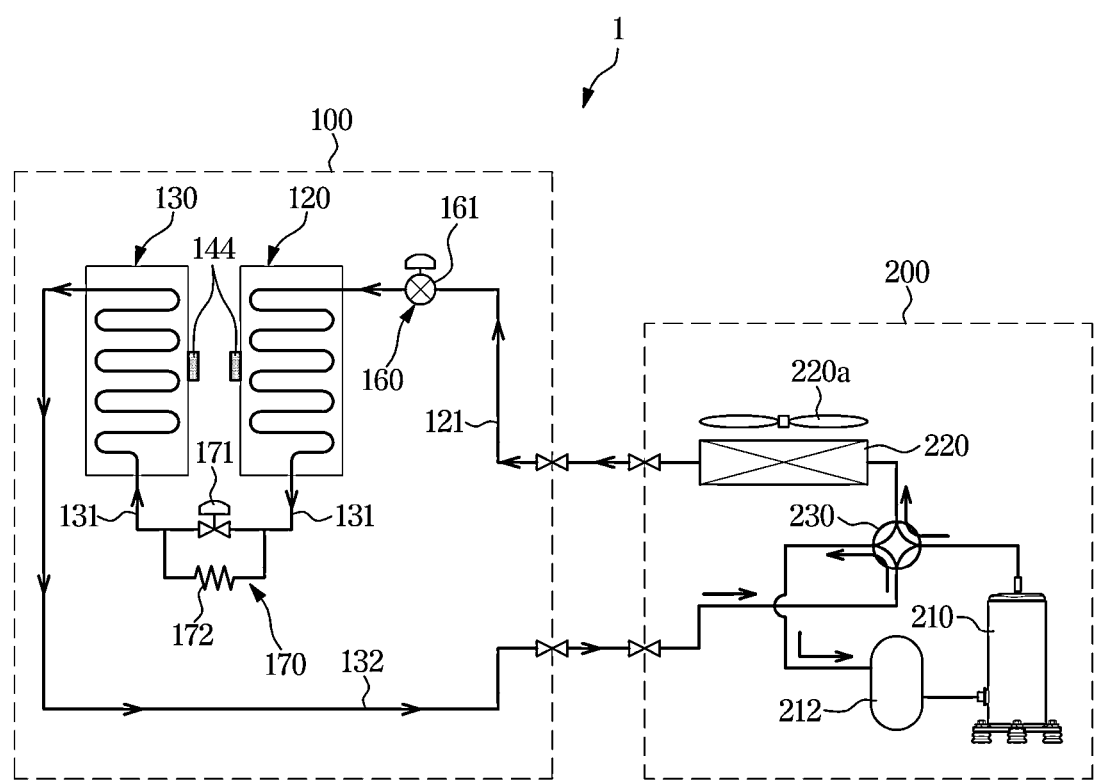
FIG. 3 illustrates circulation of a refrigerant during a ventilating operation of a ventilation system or during cleaning of a heat exchanger, according to an embodiment.
Figure 4:
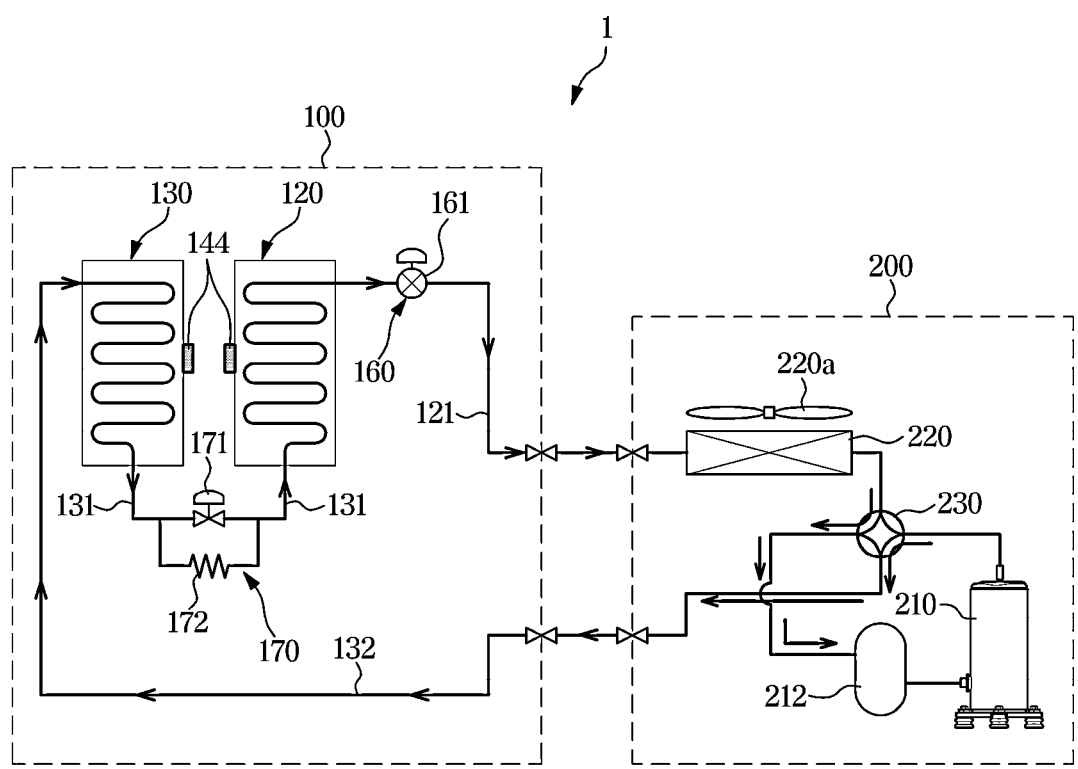
FIG. 4 illustrates circulation of a refrigerant during drying of a total heat exchanger of a ventilation system, according to an embodiment.

FIG. 3 illustrates circulation of a refrigerant during a ventilating operation of a ventilation system or during cleaning of a heat exchanger, according to an embodiment. FIG. 4 illustrates circulation of a refrigerant during drying of a total heat exchanger of a ventilation system, according to an embodiment.

Referring to FIGS. 3 and 4, the outdoor unit 200 may include a compressor 210 for compressing a refrigerant, an accumulator 212 for preventing a liquid refrigerant not yet evaporated from flowing into the compressor 210, an outdoor heat exchanger 220 for performing heat exchange between the outside air and the refrigerant, and a cooling fan 220a arranged around the outdoor heat exchanger 220. The outdoor unit 200 may also include a four-way valve 230 for switching circulation direction of the refrigerant.

The compressor 210 may operate when receiving electric energy from an external power source. The compressor 210 includes a compressor motor (not shown) and compresses a gaseous refrigerant of low pressure into high pressure by using the rotational force of the compressor motor. When the ventilation system 1 performs a ventilating operation or operates in a heat exchanger cleaning mode, the outdoor heat exchanger 220 may operate as a condenser. When the ventilation system 1 operates in a total heat exchanger drying mode, the outdoor heat exchanger 220 may operate as an evaporator.

When the ventilation system 1 performs a ventilating operation or operates in the heat exchanger cleaning mode, the four-way valve 230 may be controlled to lead the refrigerant compressed by the compressor 210 to the outdoor heat exchanger 220. In other words, when the ventilation system 1 operates in the ventilation mode or in the heat exchanger cleaning mode, the refrigerant may pass through the outdoor heat exchanger 220 from the compressor 210 and may be supplied to the heat exchangers 120 and 130 in the ventilator 100.

When the ventilation system 1 operates in the total heat exchanger drying mode, the four-way valve 230 may be controlled to lead the refrigerant compressed by the compressor 210 to the heat exchangers 120 and 130 in the ventilator 100. In other words, when the ventilation system 1 operates in the total heat exchanger drying mode, the refrigerant may pass through the heat exchangers 120 and 130 in the ventilator 100 from the compressor 210 and may be supplied to the outdoor heat exchanger 220.

When the cooling fan 220a operates, the air outside the outdoor unit 200 may flow into the outdoor heat exchanger 220, and the air flowing into the outdoor unit 200 may pass through the outdoor heat exchanger 220 and move back to the outside of the outdoor unit 200.

The outdoor unit 200 corresponds to an outdoor unit for air conditioner commonly known to this industry, so those of ordinary skill in the art may easily change or add various components required for practice of the outdoor unit 200. As such, as the ventilation system 1 as disclosed herein may operate using the outdoor unit 200, which is commonly used, and thus, the ventilator 100 does not need such an extra component as the compressor, the ventilator 100 may become small in size and have a reduced manufacturing cost.

The first heat exchanger 120 in the ventilator 100 may be connected to the outdoor unit 200 by a first refrigerant tube 121. The first heat exchanger 120 may be connected to the outdoor heat exchanger 220 in the outdoor unit 200. The second heat exchanger 130 may be connected to the first heat exchanger 120 by a second refrigerant tube 131. The second heat exchanger 130 may be connected to the outdoor unit 200 by a third refrigerant tube 132. The second heat exchanger 130 may be connected to the accumulator 212 in the outdoor unit 200.

The ventilator 100 may include a first expansion device 160 arranged in the first refrigerant tube 121. The first expansion device 160 may selectively expand the refrigerant supplied to the first heat exchanger 120 through the first refrigerant tube 121. The refrigerant that has passed the first expansion device 160 may be in a more decompressed state than before passing through the first expansion device 160.

The ventilator 100 may include a second expansion device 170 arranged in the second refrigerant tube 131. The second expansion device 170 may selectively expand the refrigerant discharged from the first heat exchanger 120 and supplied to the second heat exchanger 130 through the second refrigerant tube 131. The refrigerant that has passed the second expansion device 170 may be in a more decompressed state than before passing through the second expansion device 170. The first expansion device 160 and the second expansion device 170 may be arranged in the housing 101. The second refrigerant tube 131 may be arranged in the housing 101.

The first expansion device 160 may expand a high temperature and high pressure refrigerant to a low temperature and low pressure refrigerant according to a throttling action, and regulate a flow rate of the refrigerant supplied to the first heat exchanger 120. The first expansion device 160 may decompress the refrigerant by using the throttling action by which the refrigerant is decompressed by passing through a narrow flow path without exchanging heat with the outside. For example, the first expansion device 160 may include an electronic expansion valve (EEV) 161. The EEV 161 may regulate the expansion degree and flow rate of the refrigerant by controlling the opening degree. When the EEV 161 is fully opened, the refrigerant may pass the EEV 161 without resistance and may not expand.

The second expansion device 170 may also expand the refrigerant according to the throttling action. For example, the second expansion device 170 may include a solenoid valve 171 and a capillary tube 172 connected in parallel with the solenoid valve 171. When the solenoid valve 171 is locked, the refrigerant may move to the capillary tube 172 to be expanded by throttling, and when the solenoid valve 171 is unlocked, the refrigerant may flow through the solenoid valve 171 without resistance and may not be expanded. To efficiently control the flow and expansion of the refrigerant, the solenoid valve 171 may be replaced by the EEV.

However, it is not limited thereto. For example, the first expansion device 160 and the second expansion device 170 may all include the EEVs. The first expansion device 160 may include a solenoid valve and a capillary tube connected in parallel with the solenoid valve, and the second expansion device 170 may include an EEV. The first expansion device 160 and the second expansion device 170 may each include a solenoid valve and a capillary tube connected in parallel with the solenoid valve. The solenoid valve connected in parallel with the capillary tube may, of course, be replaced by an EEV.

For the ventilation mode of the ventilation system 1 for ventilating the indoor space by sucking in outside air, a first dehumidification mode, a second dehumidification mode, and an air blow mode may be provided. The ventilation system 1 may operate in one of the first dehumidification mode, the second dehumidification mode, and the air blow mode for the ventilating operation. The processor 193 in the ventilator 100 may control the ventilator 100 to operate the ventilator 100 in the first dehumidification mode, the second dehumidification mode, or the air blow mode. The ventilator 100 may operate while switching into the first dehumidification mode, the second dehumidification mode, and the air blow mode based on the room temperature and the room humidity.

The first dehumidification mode will now be described. In the first dehumidification mode, the first expansion device 160 may expand the refrigerant. The second expansion device 170 may or may not expand the refrigerant. It may be desirable that the second expansion device 170 may not expand the refrigerant in the first dehumidification mode so that the refrigerant flows smoothly. For this, the solenoid valve 171 of the second expansion device 170 may be opened in the first dehumidification mode.

Referring to FIG. 3, when the ventilation system 1 operates in the first dehumidification mode, the high temperature and high pressure refrigerant discharged from the compressor 210 may be condensed by the outdoor heat exchanger 220 in the outdoor unit 200 and may then flow into the first expansion device 160. The first expansion device 160 may expand the high temperature and high pressure refrigerant into a low temperature and low pressure state so that the refrigerant may be evaporated by the first heat exchanger 120 and the second heat exchanger 130. The refrigerant expanded by the first expansion device 160 may flow into the first heat exchanger 120, and evaporate by exchanging heat with air passing the first heat exchanger 120. The refrigerant discharged from the first heat exchanger 120 and flowing into the second heat exchanger 130 may evaporate once again in the second heat exchanger 130. The first heat exchanger 120 and the second heat exchanger 130 may condense and remove moisture contained in the air passing the first heat exchanger 120 and the second heat exchanger 130 and may cool down the air. That is, the ventilation system 1 operating in the first dehumidification mode may reduce both temperature and humidity of the outside air sucked into the indoor space.

The air supplied into the indoor space by the ventilator 100 operating in the first dehumidification mode may have temperature and humidity that makes the user feel pleasant. The ventilator 100 operating in the first dehumidification mode discharges the cool and dry air into the indoor space, so the first dehumidification mode may be referred to as a cooling and dehumidification mode.

The second dehumidification mode will now be described. In the second dehumidification mode, the first expansion device 160 may not expand the refrigerant. The second expansion device 170 may expand the refrigerant. A high temperature and high pressure refrigerant discharged from the compressor 210 may be condensed by the outdoor heat exchanger 220 in the outdoor unit 200 and may then flow into the first heat exchanger 120. On receiving the refrigerant, the first heat exchanger 120 may condense the refrigerant. High temperature and high pressure refrigerant discharged from the first heat exchanger 120 may be expanded by the second expansion device 170 to low temperature and low pressure refrigerant. The expanded refrigerant may flow into the second heat exchanger 130 and may be evaporated by exchanging heat with air passing the second heat exchanger 130.

In the second dehumidification mode, the air moving in the intake flow path 102 may pass the second heat exchanger 130 and the first heat exchanger 120 in sequence. The second heat exchanger 130 may condense and remove moisture contained in air passing the second heat exchanger 130 and may cool and dehumidify the air passing the second heat exchanger 130. The first heat exchanger 120 may heat the air from which the moisture is removed by the second heat exchanger 130 by condensing the refrigerant. The air that has been cooled while passing the second heat exchanger 130 is heated back by the first heat exchanger 120, so the temperature may rise higher than when the air passed the second heat exchanger 130.

Hence, relative humidity of the air that has passed the second heat exchanger 130 and the first heat exchanger 120 may be further reduced than the relative humidity of air that has passed only the second heat exchanger 130. Accordingly, air having temperature and humidity that makes the user feel pleasant may be supplied into the indoor space. The ventilator 100 operating in the second dehumidification mode may discharge dry air having the same or similar temperature to the room temperature into the indoor space, so the second dehumidification mode may be referred to as a constant temperature dehumidification mode.

The air blow mode will now be described. In the air blow mode, the refrigerant may not be supplied to the first heat exchanger 120 and the second heat exchanger 130, and only heat exchange between the outside air and the room air may be performed by the total heat exchanger 110. The processor 193 may operate the ventilator 100 in the air blow mode by blocking the flow of the refrigerant flowing into the ventilator 100, blocking the refrigerant flowing into the ventilator 100 from flowing into the heat exchanger 120 or 130, or turning off the outdoor unit 200.

In the meantime, with accumulated use of the ventilator 100, foreign materials (e.g., dust) may adhere to the surface of the heat exchangers 120 and 130. Contamination of the heat exchangers 120 and 130 may deteriorate heat transfer performance of the heat exchangers 120 and 130 and lead to contamination of the air passing the heat exchangers 120 and 130. Hence, cleaning of the heat exchangers 120 and 130 is required.

The ventilation system 1 as disclosed herein may clean the heat exchangers 120 and 130 by performing a process of forming frost on the heat exchangers 120 and 130 and then defrosting the heat exchangers 120 and 130. The cleaning of the heat exchangers 120 and 130 may be referred to as freeze washing. When operating in the heat exchanger cleaning mode, the ventilation system 1 may operate the outdoor unit 200 to form frost on the heat exchangers 120 and 130 and stop operating the outdoor unit 200 to defrost the heat exchangers 120 and 130.

Referring to FIG. 3, when the ventilation system 1 operates in the heat exchanger cleaning mode, the four-way valve 230 may be controlled to lead the refrigerant compressed by the compressor 210 to the outdoor heat exchanger 220. In other words, when the ventilation system 1 operates in the heat exchanger cleaning mode, the refrigerant may pass through the outdoor heat exchanger 220 from the compressor 210 and may be supplied to the heat exchangers 120 and 130 in the ventilator 100.

When the ventilation system 1 operates in the heat exchanger cleaning mode, the first expansion device 160 may be controlled to expand the refrigerant. The second expansion device 170 may or may not expand the refrigerant. It may be desirable that the second expansion device 170 may not expand the refrigerant in the first dehumidification mode so that the refrigerant flows smoothly. The refrigerant is evaporated by exchanging heat with surrounding air while passing the first heat exchanger 120 and the second heat exchanger 130. Accordingly, the air around the heat exchangers 120 and 130 is cooled.

As such, when the heat exchangers 120 and 130 in the ventilator 100 are operated as evaporators, the surrounding air is cooled and thus, the surface temperature of the heat exchangers 120 and 130 may drop to or below 0° C., which is the freezing point of water. Accordingly, vapor around the heat exchangers 120 and 130 may lose heat, so that frost may be formed on the surface of the heat exchangers 120 and 130. Afterward, when the operation of the outdoor unit 200 is stopped, the refrigerant is not circulated through the heat exchangers 120 and 130 in the ventilator 100, so temperatures on the surface of and around the heat exchangers 120 and 130 rise and the frost thaws. The thawed frost is changed in phase to water in a liquid state, and the water in the liquid state may flow down with the foreign materials that have adhered to the surface of the heat exchangers 120 and 130. That is, the heat exchangers 120 and 130 may be washed by frosting and defrosting.

The circulation direction of the refrigerant in the heat exchanger cleaning mode is the same as a circulation direction of the refrigerant in the ventilation mode. However, the ventilation mode and the heat exchanger cleaning mode differ in that different air flow paths are formed. Specifically, operations of the air blowers 109a and 109b and operations of the dampers 330, 340 and 350 are differently controlled depending on the ventilation mode or the heat exchanger cleaning mode.

As described above in connection with FIG. 2, when the ventilation system 1 operates in the ventilation mode, both the first air blower 109a and the second air blower 109b operate. Furthermore, the first damper 330 arranged at the first intake 101a is opened, the third damper 350 arranged at the second intake 101c is opened, and the second damper 340 arranged in the connection flow path 102b is closed. Hence, the outside air OA sucked in through the first intake 101a is discharged into the indoor space through the first outlet 101b, and the room air RA sucked in through the second intake 101c is discharged to the outdoor space through the second outlet 101d.

As described above, the ventilation system 1 operates the compressor 210 to form frost on the heat exchangers 120 and 130 in the heat exchanger cleaning mode. Accordingly, the air passing the heat exchangers 120 and 130 is cooled. By the way, when the air cooled by the heat exchangers 120 and 130 flows into the second duct D2 directly through the first outlet 101b, the second duct D2 may be frosted. When the frost formed on the second duct D2 is neglected, the second duct D2 may go moldy. As the second duct D2 is connected to the indoor space, the frost formed on the second duct D2 may end up contaminating the indoor space. Hence, the ventilation system 1 as disclosed herein changes air flow paths to prevent frosting on the second duct D2, when operating in the heat exchanger cleaning mode.

To prevent frosting on the second duct D2, the first air blower 109a is controlled to be stopped and the second air blower 109b is controlled to be operated when the ventilation system 1 operates in the heat exchanger cleaning mode. Furthermore, the first damper 330 is closed and the second damper 340 is opened. The third damper 350 may be closed or opened. The second air blower 109b may continue to operate until the end of the heat exchanger washing. In response to termination of operation of the outdoor unit 200, the second air blower 109b may be controlled to be stopped for a preset period of time and then operated again.

For example, when the first damper 330 and the third damper 350 are closed and only the second air blower 109b operates, the room air is sucked into the housing 101 through the first outlet 101b, and the room air sucked in passes the heat exchangers 120 and 130, the total heat exchanger 110 and the connection flow path 102b in sequence, flows into the first discharge room 106, passes the total heat exchanger 110 again, and is then discharged to the outdoor space through the second outlet 101d. As the air cooled by the heat exchangers 120 and 130 flows to the first outlet 101b and the fourth duct D4 connected to the outdoor space, the second duct D2 connected to the indoor space may be prevented from being frosted.

In another example, when only the second air blower 109b operates while the first damper 330 is closed and the second damper 340 and the third damper 350 are opened, the room air may be sucked into the housing 101 through the first outlet 101b and the second intake 101c. The room air sucked in through the first outlet 101b passes the heat exchangers 120 and 130, the total heat exchanger 110 and the connection flow path 102b in sequence, flows into the first discharge room 106, passes the total heat exchanger 110 again, and is then discharged to the outdoor space through the second outlet 101d. The room air sucked in through the second intake 101c passes the total heat exchanger 110 and is then discharged to the outdoor space through the second outlet 101d. As only the second air blower 109b operates, the room air may be sucked in through the first outlet 101b even when the third damper 350 is opened.

Furthermore, with accumulated use of the ventilator 100, foreign materials (e.g., dust) may adhere to the surface of the total heat exchanger 110. For example, when there is a big difference between the outside temperature and the room temperature, moisture may be caused by condensing in the process of heat exchange between the room air and the outside air in the total heat exchanger 110. When the operation of the ventilator 100 is terminated while the moisture is formed on the total heat exchanger 110, mold may be caused by the moisture and the foreign materials (e.g., dust) adhered to the surface of the total heat exchanger 110. When air that has passed the moldy total heat exchanger 110 is supplied into the indoor space, quality of the room air may become worse. Hence, a drying operation of the total heat exchanger 110 may be performed to prevent the total heat exchanger 110 from being contaminated.

Referring to FIG. 4, when the ventilation system 1 operates in the total heat exchanger drying mode, the four-way valve 230 may be controlled to lead the refrigerant compressed by the compressor 210 to the heat exchangers 120 and 130 in the ventilator 100. In other words, when the ventilation system 1 operates in the total heat exchanger drying mode, the refrigerant may pass through the heat exchangers 120 and 130 in the ventilator 100 from the compressor 210 and may be supplied to the outdoor heat exchanger 220. When the ventilation system 1 operates in the total heat exchanger drying mode, the first expansion device 160 may be controlled to expand the refrigerant. The second expansion device 170 may be controlled not to expand the refrigerant. The refrigerant is condensed in the first heat exchanger 120 and the second heat exchanger 130, and air around the heat exchangers 120 and 130 is heated.

To form an air flow path in which the heated air passes the total heat exchanger 110, the first air blower 109a is controlled to be stopped and the second air blower 109b is controlled to be operated. Furthermore, the first damper 330 is closed and the second damper 340 is opened. The third damper 350 may be closed or opened. The second air blower 109b may continue to operate until the end of the drying of the total heat exchanger. In the total heat exchanger drying mode and the heat exchanger cleaning mode, the same air flow path may be formed in the ventilator 100.

For example, when the first damper 330 and the third damper 350 are closed and only the second air blower 109b operates, the room air is sucked into the housing 101 through the first outlet 101b, and the room air sucked in passes the heat exchangers 120 and 130, the total heat exchanger 110 and the connection flow path 102b in sequence, flows into the first discharge room 106, passes the total heat exchanger 110 again, and is then discharged to the outdoor space through the second outlet 101d.

In another example, when only the second air blower 109b operates while the first damper 330 is closed and the second damper 340 and the third damper 350 are opened, the room air may be sucked into the housing 101 through the first outlet 101b and the second intake 101c. The room air sucked in through the first outlet 101b passes the heat exchangers 120 and 130, the total heat exchanger 110 and the connection flow path 102b in sequence, flows into the first discharge room 106, passes the total heat exchanger 110 again, and is then discharged to the outdoor space through the second outlet 101d. The room air sucked in through the second intake 101c passes the total heat exchanger 110 and is then discharged to the outdoor space through the second outlet 101d. As only the second air blower 109b operates, the room air may be sucked in through the first outlet 101b even when the third damper 350 is opened.

As such, the air heated by the heat exchangers 120 and 130 passes the total heat exchanger 110, and the total heat exchanger 110 may be effectively dried. In addition, as the drying of the total heat exchanger 110 is performed bi-directionally, drying efficiency may be improved.

Figure 5:
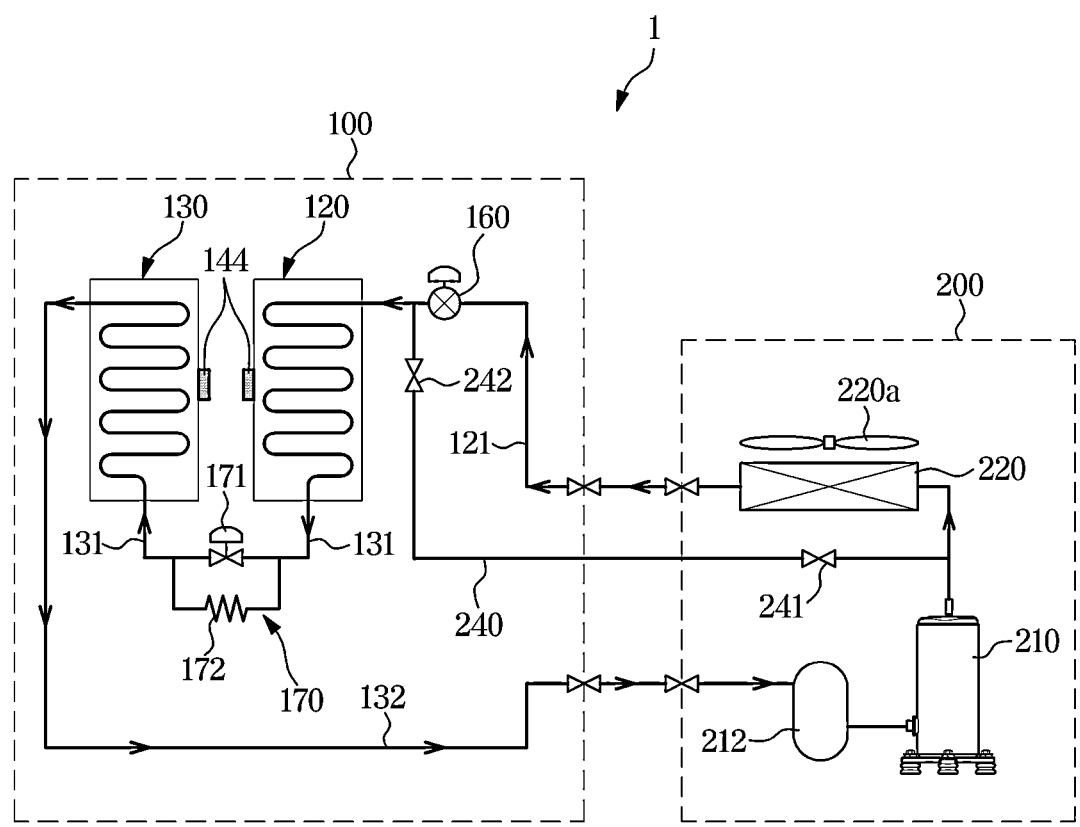
FIG. 5 illustrates a configuration of a ventilation system, according to another embodiment.

FIG. 5 illustrates a configuration of a ventilation system, according to another embodiment.

Referring to FIG. 5, the outdoor unit 200 according to another embodiment may not include the four-way valve 230. The indoor unit that does not include the four-way valve 230 may be referred to as a cooling-dedicated outdoor unit. The ventilation system 1 in the embodiment may include a hot gas line 240 bypassing from the compressor 210 of the outdoor unit 200. The hot gas line 240 may bypass from the compressor 210 to be connected to the first heat exchanger 120. A first hot gas valve 241 may be arranged on one side of the hot gas line 240 and a second hot gas valve 242 may be arranged on the other side of the hot gas line 240.

The ventilation system 1 operating in the total heat exchanger drying mode may heat air passing the heat exchangers 120 and 130 by using hot gas discharged from the compressor 210. For this, the first expansion device 160 is closed and the first hot gas valve 241 and the second hot gas valve 242 are opened. As the first expansion device 160 is closed, the refrigerant is blocked from being supplied from the outdoor heat exchanger 220 to the heat exchangers 120 and 130. And the hot gas is supplied to the heat exchangers 120 and 130 along the hot gas line 240 from the compressor 210. The hot gas brought into the heat exchangers 120 and 130 may heat air around the heat exchangers 120 and 130.

To form an air flow path in which the heated air passes the total heat exchanger 110, the first air blower 109a is controlled to be stopped and the second air blower 109b is controlled to be operated. Furthermore, the first damper 330 is closed and the second damper 340 is opened. The third damper 350 may be closed or opened. The second air blower 109b may continue to operate until the end of the drying of the total heat exchanger. As the air heated by the heat exchangers 120 and 130 passes the total heat exchanger 110, the total heat exchanger 110 may be effectively dried. In addition, as the drying of the total heat exchanger 110 is performed bi-directionally, drying efficiency may be improved.

When the ventilation system 1 operates in the ventilation mode or the heat exchanger cleaning mode, the first hot gas valve 241 and the second hot gas valve 242 are closed. Furthermore, the first expansion device 160 is opened for the refrigerant to flow into the heat exchangers 120 and 130, and the opening degree of the first expansion device 160 is controlled for expansion of the refrigerant.

Figure 6:
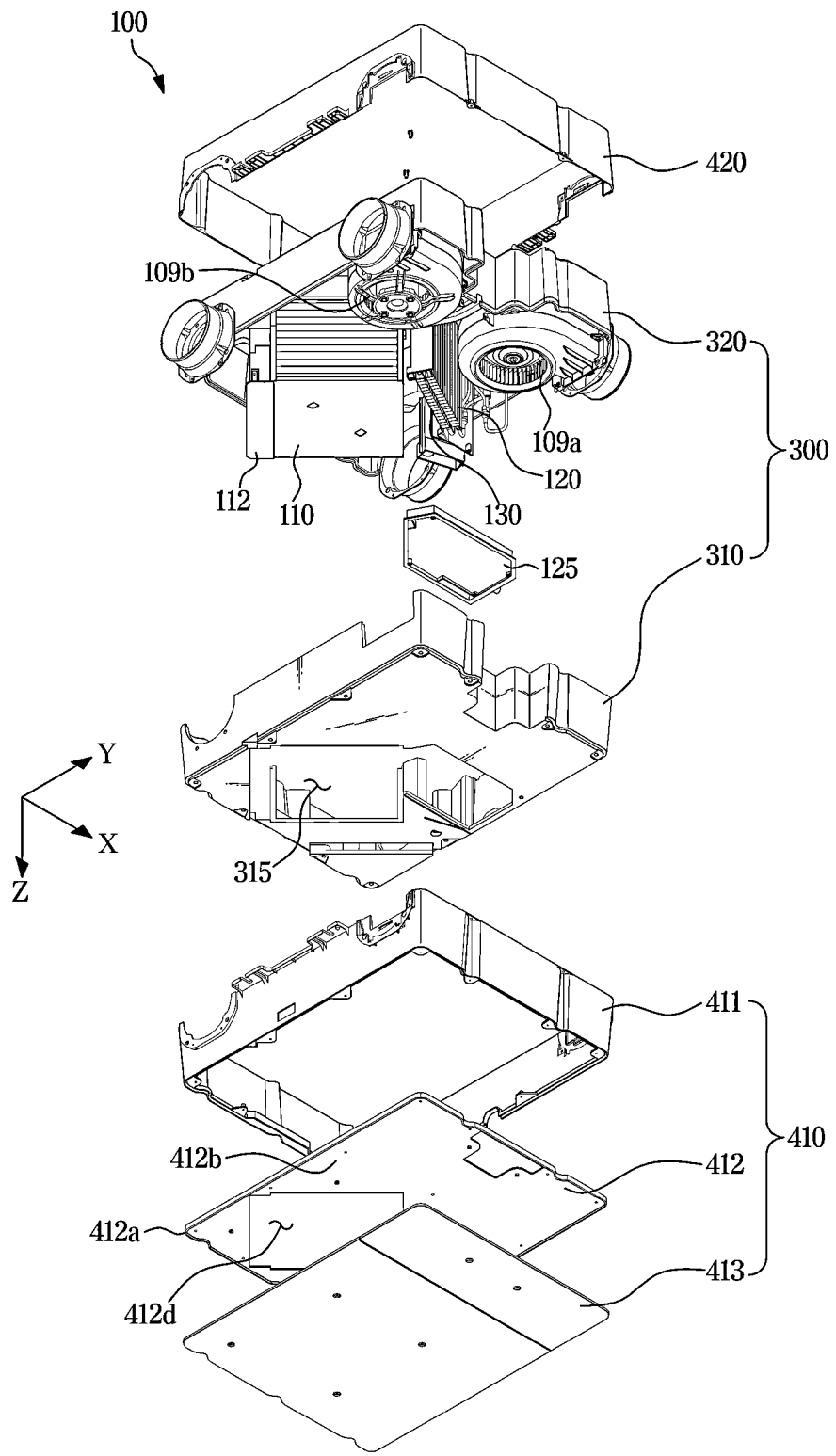
FIG. 6 is an exploded perspective view of a ventilator, according to an embodiment.
Figure 7:
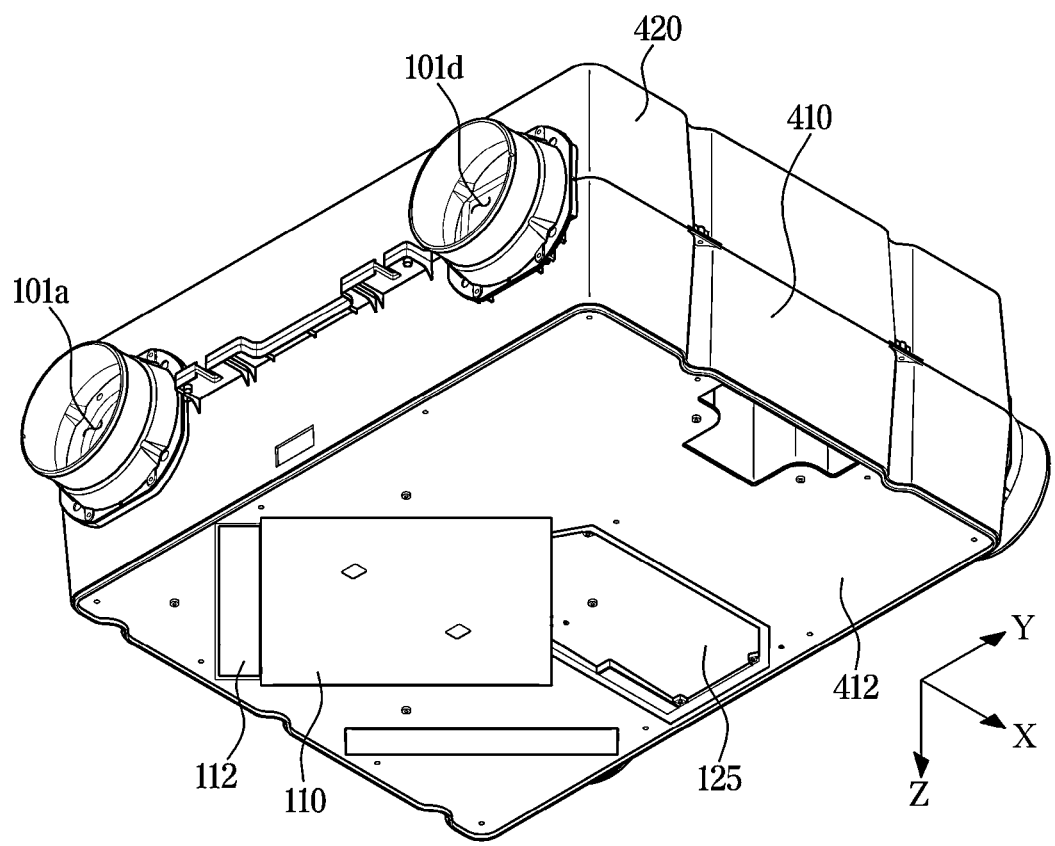
FIG. 7 is a perspective view of a ventilator with some components removed therefrom, which is viewed from below, according to an embodiment.
Figure 8:
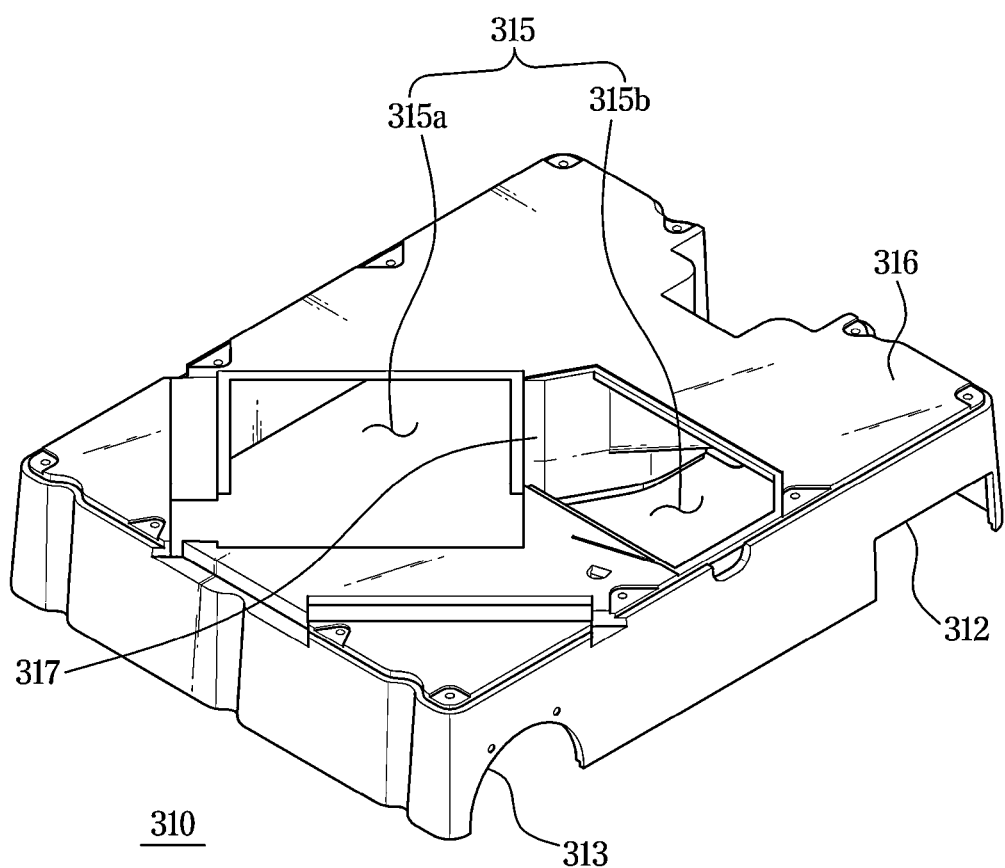
FIG. 8 is a first inner housing of the ventilator shown in FIG. 6, which is upside down.
Figure 9:
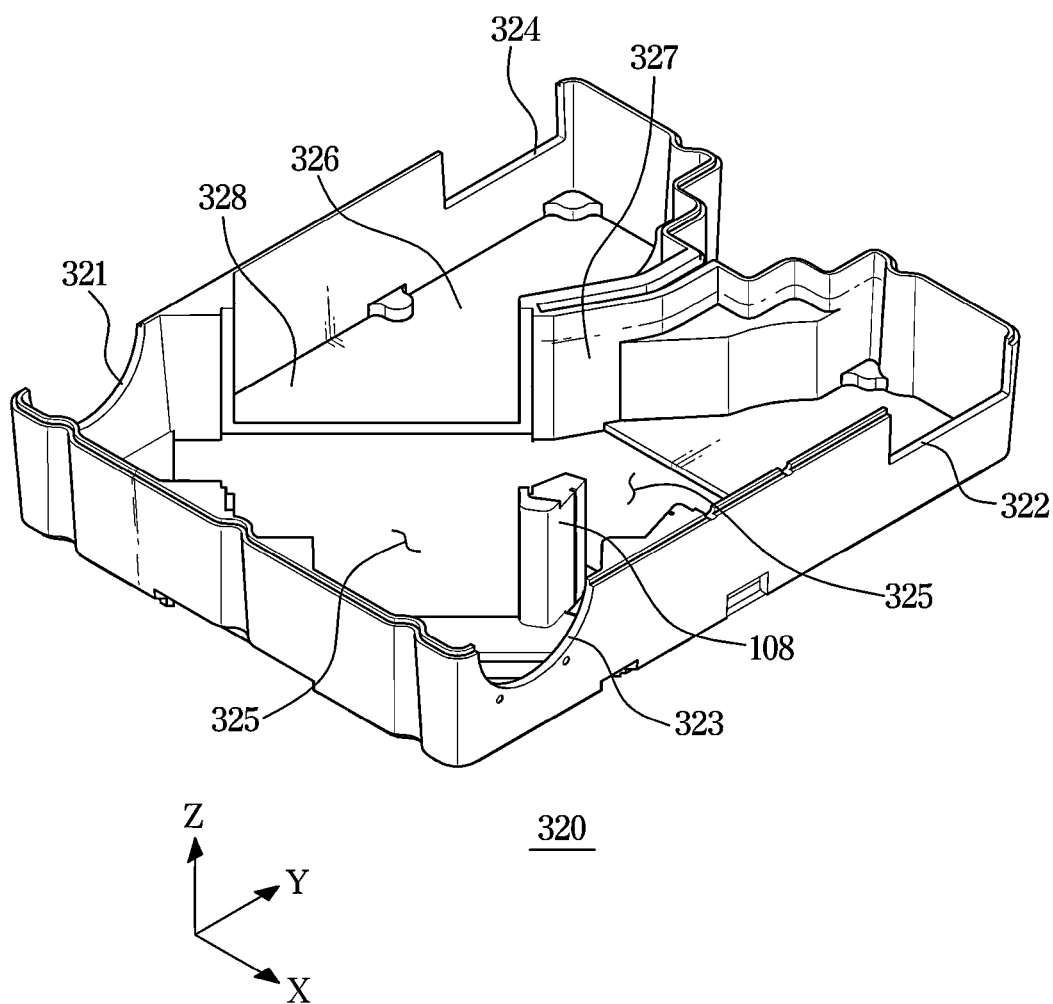
FIG. 9 is a second inner housing of the ventilator shown in FIG. 6, which is upside down.

FIG. 6 is an exploded perspective view of a ventilator, according to an embodiment. FIG. 7 is a perspective view of a ventilator with some components removed therefrom, which is viewed from below, according to an embodiment. FIG. 8 is a first inner housing of the ventilator shown in FIG. 6, which is upside down. FIG. 9 is a second inner housing of the ventilator shown in FIG. 6, which is upside down.

Referring to FIG. 6, the ventilator 100 may include a drain tray 125 for collecting condensate water produced from the heat exchangers 120 and 130. The drain tray 125 may be arranged under the heat exchangers 120 and 130 in the vertical direction Z.

The housing 101 may include a first inner housing 310 and a second inner housing 320. The second inner housing 320 may be coupled with the first inner housing 310 in the vertical direction Z. The inner housings 310 and 320 may be formed of an insulation material. For example, the inner housings 310 and 320 may be formed of an expanded polystyrene insulation (EPS) material such as polystyrene. It is not, however, limited thereto, and the inner housings 310 and 320 may be formed of various insulation materials provided to keep the air moving in the intake flow path 102 and the discharge flow path 103 at a constant temperature.

The ventilator 100 may include covers 410 and 420 provided to form the exterior of the housing 101 and cover the inner housings 310 and 320. The covers 410 and 420 may include a first cover 410 arranged below in the vertical direction Z and a second cover 420 arranged above and coupled to the first cover 410. The first cover 410 may form a lower exterior of the ventilator 100, and the second cover 420 may form an upper exterior of the ventilator 100. The covers 410 and 420 may protect the inner housings 310 and 320 from the outside by covering the inner housings 310 and 320. For example, the covers 410 and 420 may be made of an injection-molded material such as plastic.

The first inner housing 310 may be inserted to the first cover 410, and the second inner housing 320 may be inserted to the second cover 420. From bottom to top of the ventilator 100, the first cover 410, the first inner housing 310, the second inner housing 320 and the second cover 420 may be arranged in sequence.

The components of the ventilator 100 such as the total heat exchanger 110, the filter 112, the air blowers 109a and 109b, the heat exchangers 120 and 130, and the drain tray 125 may be arranged to be supported by the first inner housing 310 and/or the second inner housing 320.

A first hole 315 may be formed on the first inner housing 310. The total heat exchanger 110, the filter 112 and the drain tray 125 may be arranged to be separable from the ventilator 100 through the first hole 315 of the first inner housing 310. The second inner housing 320 may include a second hole 325 formed to match the first hole 513 of the first inner housing 310.

The first cover 410 may include a body part 411 shaped like a rectangular frame, a plane part 412 detachably coupled to the body part 411 and shaped like a plate, and a lower cover part 413 arranged to cover the plane part 412 from the bottom. The plane part 412 of the first cover 410 may include a plate body 412a, a first surface 412b of the plate body 412a, and a second surface arranged on the other side of the first surface 412b.

The plane part 412 of the first cover 410 may include a third hole 412d formed to match the first hole 315 of the first inner housing 310. The third hole 412d may be formed on the plate body 412a. As the third hole 412d is formed to match the first hole 315, the third hole 412d may be asymmetrically formed on the plate body 412a around one of the long axis L and the short axis S of the housing 101.

The plane part 412 of the first cover 410 may be coupled to the body part 411 to make the first surface 412b face down. The first hole 315 and the third hole 412d may be provided in the same shape and arranged to overlap each other in the vertical direction Z.

As shown in FIG. 7, when the lower cover part 413 is separated from the first cover 410, the total heat exchanger 110 the filter 112, and the drain tray 125 may be exposed downward of the ventilator 100. Accordingly, the user may easily separate the total heat exchanger 110, the filter 112 and the drain tray 125 from the ventilator 110.

Referring to FIG. 8, the first inner housing 310 may include a first intake forming part 311 forming a portion of the first intake 101a, a first outlet forming part 312 forming a portion of the first outlet 101b, a second intake forming part 313 forming a portion of the second intake 101c, and a second outlet forming part 314 forming a portion of the second outlet 101d. The first outlet forming part 312 and the second outlet forming part 314 may be formed to be symmetrical to each other about the long axis L of the ventilator 100. The first intake forming part 311 and the second intake forming part 313 may also be formed to be symmetrical to each other about the long axis L of the ventilator 100.

The first hole 315 formed for the total heat exchanger 110, the filter 112 and the drain tray 125 to be taken out may be divided into a first section 315a from which the total heat exchanger 110 and the filter 112 are taken out and a second section 315b from which the drain tray 125 is taken out. Although the first section 315a and the second section 315b of the first hole 315 are shown in the form of being connected to each other, they are not limited thereto, in which case the first section 315a and the second section 315b may be separated from each other.

The total heat exchanger 110 may be shaped like a hexahedron. As the total heat exchanger 110 is formed to have a square cross-section and the filter 112 is arranged to be adjacent to the intake air inflow end 110a of the total heat exchanger 110, the first section 315a of the first hole 315 may be formed to have a rectangular shape. Through the first section 315a of the first hole 315, the total heat exchanger 110 and the filter 112 may be exposed to the outside.

The second section 315b of the first hole 315 may be formed to have a shape matching the shape of the drain tray 125. For example, the second section 315b may be formed to have a polygonal shape, but it is not limited thereto and may have various shapes.

Referring to FIG. 9, the second inner housing 320 may include a first intake forming part 321 forming a portion of the first intake 101a, a first outlet forming part 322 forming a portion of the first outlet 101b, a second intake forming part 323 forming a portion of the second intake 101c, and a second outlet forming part 324 forming a portion of the second outlet 101d. The first outlet forming part 322 and the second outlet forming part 324 may be formed to be symmetrical to each other. The first intake forming part 321 and the second intake forming part 323 may also be formed to be symmetrical to each other.

When the first inner housing 310 and the second inner housing 320 are assembled in the vertical direction Z, the first intake 101a, the first outlet 101b, the second intake 101c and the second outlet 101d may be formed. When a surface 316 of the first inner housing and the other surface 326 of the second inner housing 320 are arranged in parallel, the first hole 315 of the first inner housing 310 and the second hole 325 of the second inner housing 320 are in parallel.

Assuming, in the front-back direction X, a side on which the first intake 101a and the second outlet 101d are formed is referred to as one side of the housing 101, and a side on which the second intake 101c and the first outlet 101b are formed is referred to as the other side of the housing 101, the total heat exchanger 110 may be arranged to be adjacent to the one side of the housing 101. As the heat exchangers 120 and 130 are arranged in the second intake room 105 to be adjacent to the first outlet 101b and the first air blower 109a, the total heat exchanger 110 may be arranged to be as close to the first intake 101a as possible to secure as much space for the second intake 105 as possible.

The first intake room 104, the second intake room 105, the first discharge room 106 and the second discharge room 107 may be separated by the partitions 108 formed by the first inner housing 310 and the second inner housing 320. Furthermore, the partitions 108 may play a role in supporting the total heat exchanger 110. The partition 108 that separates the first discharge room 105 from the second intake room 106 may be formed by a partition forming part 317 of the first inner housing 310 and a partition forming part 327 of the second inner housing 320. A connection flow path 102a may be formed by cutting at least a portion of the partition.

Figure 10:
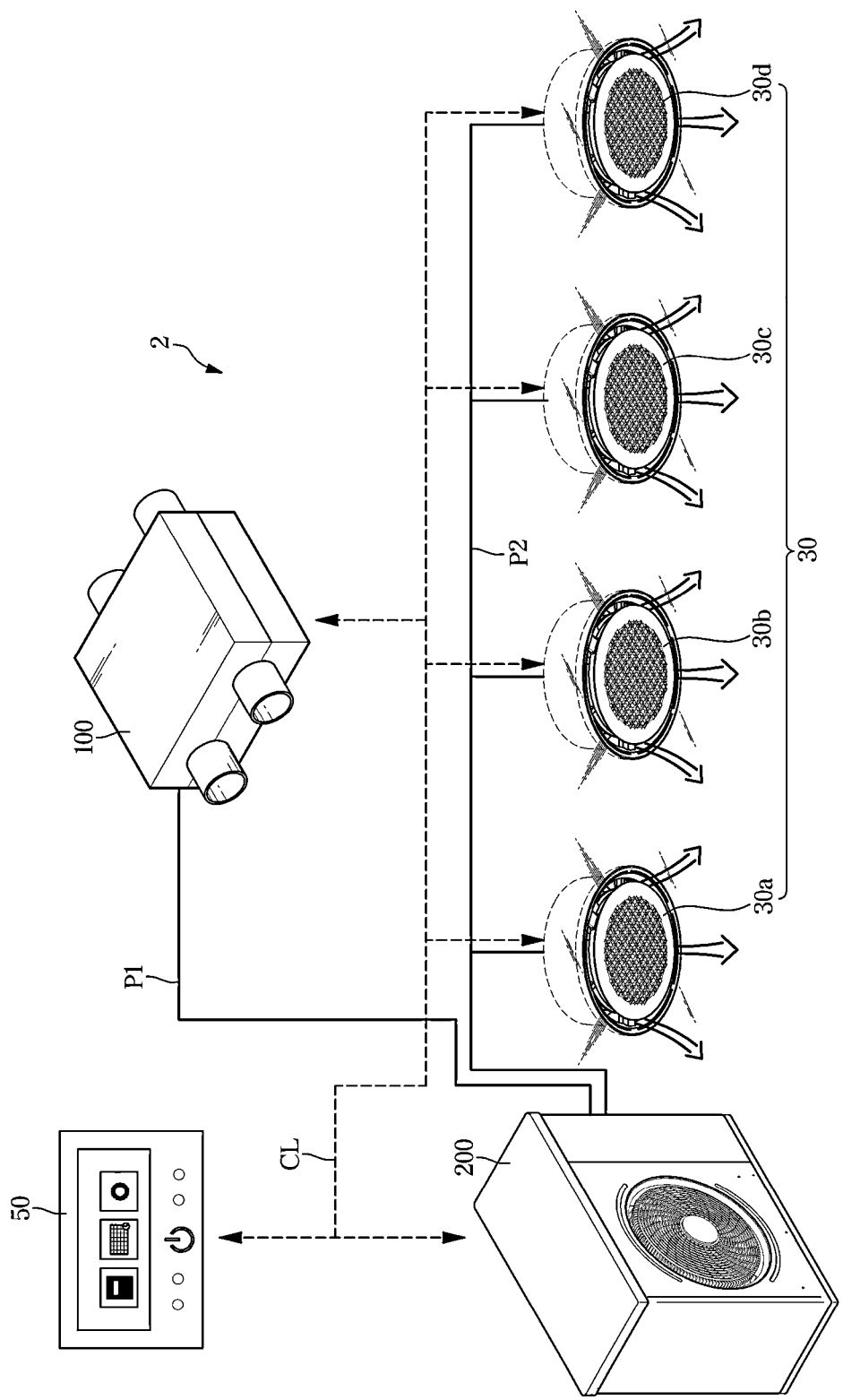
FIG. 10 illustrates an integrated air conditioning system including a ventilator, according to an embodiment.

FIG. 10 illustrates an integrated air conditioning system including a ventilator, according to an embodiment.

Referring to FIG. 10, an integrated air conditioning system 2 may include the ventilator 100, the outdoor unit 200, a plurality of indoor units 30 (30a, 30b, 30c and 30d) and an integrated controller 50. The ventilator 100 may be connected to the outdoor unit 200 by a refrigerant pipe P1. The refrigerant pipe P1 may correspond to the first refrigerant tube 121 as described above. The plurality of indoor units 30 may be connected to the outdoor unit 200 by a refrigerant pipe P2. The outdoor unit 200 may supply the refrigerant to each of the plurality of indoor units 30 through the refrigerant pipe P2.

The plurality of indoor units 30 may be installed in a plurality of different indoor spaces, respectively. For example, the plurality of indoor units 30 may be installed in a plurality of offices, a plurality of guest rooms or a plurality of rooms separated in a building, respectively. As the plurality of indoor units 30 respectively operate, air in the indoor space where each of the plurality of indoor units 30 is installed may be directly conditioned (e.g., cooled).

The ventilator 100 may be installed in many different spaces in the building. For example, the ventilator 100 may be installed in such a space as an apartment balcony or a utility room. The first intake 101a, the second intake 101c, the first outlet 101b and the second outlet 101d formed at the housing 101 of the ventilator 100 may be connected to the respective ducts. A duct connected to the second intake 101c and the first outlet 101b may extend up to the indoor space. For example, there may be a hole formed on the ceiling or the wall of the indoor space to be connected to the ventilator 100. A duct connected to the first intake 101a and the second outlet 101d may extend up to the outdoor space.

The integrated controller 50 may be electrically connected to the ventilator 100, the outdoor unit 500 and the plurality of indoor units 30. The integrated controller 50 may be electrically connected to the ventilator 100, the outdoor unit 500 and the plurality of indoor units 30 through a communication line (CL). The integrated controller 50 may control operations of the ventilator 100, the outdoor unit 200 and the plurality of indoor units 30.

The integrated controller 50 may obtain a user input, and in response to the user input, operate the integrated air conditioning system 2 and display information of the integrated air conditioning system 2. The integrated controller 50 may control the ventilator 100 and the indoor unit 30 based on the room temperature and the room humidity in the indoor space where the indoor unit 30 is placed. Cooling efficiency and dehumidification efficiency may increase and energy for cooling and dehumidification may be saved by adequately controlling operations of the ventilator 100 and the indoor unit 300.

As such, one outdoor unit 200 may be used to supply the refrigerant to the ventilator 100 and the plurality of indoor units 30. The numbers of the ventilator 100, the outdoor unit 200 and the indoor unit 30 are not limited to what are illustrated above.

The method of controlling the ventilation system 1 may also be used for the integrated air conditioning system 2 as described above in connection with FIG. 10.

Figure 11:
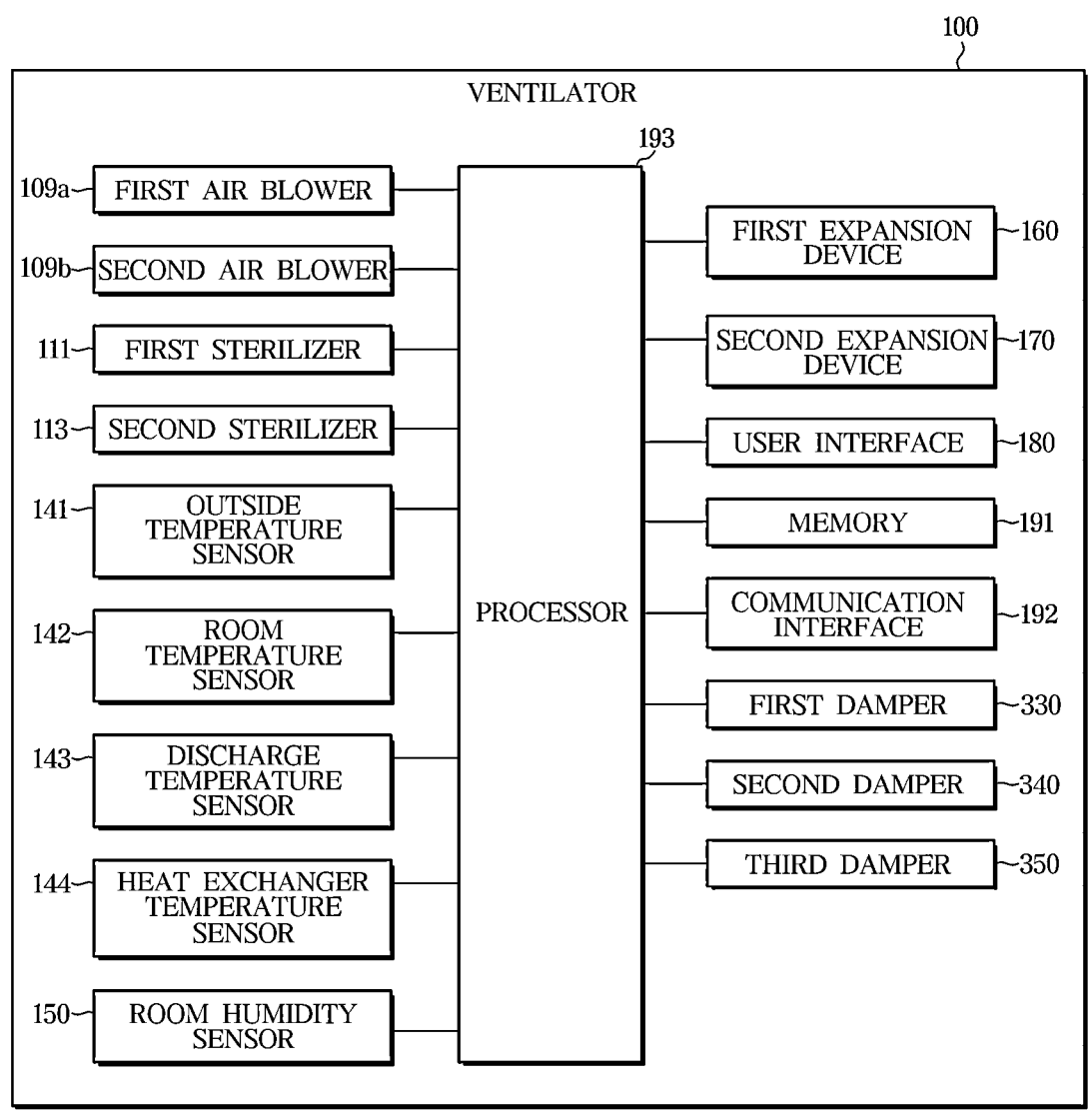
FIG. 11 is a control block diagram of a ventilator, according to an embodiment.

FIG. 11 is a control block diagram of a ventilator, according to an embodiment.

Referring to FIG. 11, the ventilator 100 may include the first air blower 109a, the second air blower 109b, the first sterilizer 111, the second sterilizer 112, the outside temperature sensor 141, the room temperature sensor 142, the discharge temperature sensor 143, the heat exchanger temperature sensor 144, the room humidity sensor 150, the first expansion device 160 and the second expansion device 170. Furthermore, the ventilator 100 may include a user interface 180, a memory 191, a communication interface 192, a processor 193, the first damper 330, the second damper 340 and the third damper 350. The processor 193 may be electrically connected to the components of the ventilator 100 to control the respective components.

The user interface 180 may obtain various user inputs about operations of the ventilator 100. The user interface 180 may output an electric signal (voltage or current) corresponding to a user input to the processor 193 of the ventilator 100. The user interface 180 may include various buttons, a dial and/or a display.

For example, the user interface 180 may obtain a command to perform the heat exchanger cleaning mode or the total heat exchanger drying mode. The processor 193 may operate the ventilation system 1 in the heat exchanger cleaning mode or the total heat exchanger drying mode based on the command to perform the heat exchanger cleaning mode or the total heat exchanger drying mode.

Furthermore, the user interface 180 may obtain a user input to arrange a schedule for heat exchanger cleaning or a schedule for total heat exchanger drying. The schedule for heat exchanger cleaning or the schedule for total heat exchanger drying may be set on a design basis. The processor 193 may periodically perform the heat exchanger cleaning operation based on the schedule for cleaning the heat exchanger. The processor may periodically perform the total heat drying operation based on the schedule for drying the total heat exchanger.

The memory 191 may memorize/store various information required for operation of the ventilation system 1. The memory 191 may store instructions, an application, data and/or a program required for operation of the ventilation system 1. The processor 193 may generate control signals for controlling operation of the ventilation system 1 based on the instructions, application, data and/or program stored in the memory 191.

Furthermore, the ventilator 1 may include the communication interface 192 for communicating with the outdoor unit 200, the indoor unit 30 and/or the integrated controller 50. The ventilator 1 may operate based on a control signal transmitted from the integrated controller 50 through the communication interface 192. Furthermore, the processor 193 of the ventilator 100 may generate a control signal for operating the outdoor unit 200 and transmit the control signal to the outdoor unit 200 through the communication interface 192.

As described above, with accumulated use of the ventilator 100, the total heat exchanger 110 and the heat exchangers 120 and 130 may be contaminated. To manage the total heat exchanger 110 and the heat exchangers 120 and 130 to be clean, cleaning of the heat exchangers 120 and 130 and drying of the total heat exchanger 110 are required. It is desirable to perform the heat exchanger cleaning operation and the total heat exchanger drying operation after the ventilating operation of ventilating the indoor space by sucking in outside air is completed.

The processor 193 may enter the heat exchanger cleaning mode or the total heat exchanger drying mode after the ventilating operation of operating both the first air blower 109a and the second air blower 109b is completed. For example, the processor 193 may enter the heat exchanger cleaning mode or the total heat exchanger drying mode based on an accumulated operation time of the ventilation operation reaching a preset threshold time. Furthermore, the processor 193 may periodically enter the heat exchanger cleaning mode or the total heat exchanger drying mode based on a preset schedule. The processor 193 may operate the ventilator 100 and the outdoor unit 200 in the heat exchanger cleaning mode or the total heat exchanger drying mode based on a command obtained through the user interface 180.

The processor 193 may control the outdoor unit 200 to supply the refrigerant to the heat exchangers 120 and 130 based on the heat exchanger cleaning mode or the total heat exchanger drying mode.

When operating in the heat exchanger cleaning mode, the processor 193 may operate the outdoor unit 200 to form frost on the heat exchangers 120 and 130 and stop operating the outdoor unit 200 to defrost the heat exchangers 120 and 130. The processor 193 may determine to stop operating the outdoor unit 200 based on a temperature measured by the heat exchanger temperature sensor 144 being lower than a preset threshold temperature. Alternatively, the processor 193 may determine to stop operating the outdoor unit 200 based on the operation time of the outdoor unit 200 reaching the preset limit time after entering the heat exchanger cleaning mode.

As described above in connection with FIG. 3, the processor 193 may control the compressor 210 and the four-way valve 230 to supply the refrigerant to the heat exchangers 120 and 130 in the ventilator 100 after the refrigerant passes the outdoor heat exchanger 220 from the compressor 210 in the heat exchanger cleaning mode. As described above in connection with FIG. 4, the processor 193 may control the compressor 210 and the four-way valve 230 to supply the refrigerant to the outdoor heat exchanger 220 after the refrigerant passes the heat exchangers 120 and 130 in the ventilator 100 from the compressor 210 in the total heat exchanger drying mode. When the outdoor unit 200 including the four-way valve 230 is used, flows of the refrigerant in the heat exchanger cleaning mode and the total heat exchanger drying mode may be opposite to each other.

As described above in connection with FIG. 5, the outdoor unit 200 according to another embodiment may not include the four-way valve 230. The ventilation system 1 in this embodiment may include a hot gas line 240 bypassing from the compressor 210 of the outdoor unit 200. The processor 193 may close the first expansion device 160 and open the first hot gas valve 241 and the second hot gas valve 242 to heat the air passing the heat exchangers 120 and 130 by using a hot gas discharged from the compressor 210 in the total heat exchanger drying mode.

The processor 193 may control the plurality of dampers arranged in the housing 101 based on the heat exchanger cleaning mode or the total heat exchanger drying mode so that the room air flows into the housing 101 through the first outlet 101b of the ventilator 100, passes the heat exchangers 120 and 130 and total heat exchanger 110 in sequence and is then discharged to the outdoor space through the second outlet 101d.

Furthermore, the processor 193 may stop the first air blower 109a and operate the second air blower 109b based on the heat exchanger cleaning mode or the total heat exchanger drying mode. For example, the processor 193 may operate the second air blower 109b until the heat exchanger cleaning operation or the total heat exchanger drying operation is completed. The processor 193 may operate the second air blower 109b while the outdoor unit 200 is operating in the heat exchanger cleaning mode, and in response to termination of operation of the outdoor unit 200, may temporarily stop the second air blower 109b. The processor 193 may stop the second air blower 109b for a preset period of time in response to the termination of operation of the outdoor unit 200 and then operate the second blower 109b again.

In the heat exchanger cleaning mode, to form frost on the heat exchangers 120 and 130, air needs to be constantly supplied to the heat exchangers 120 and 130 during operation of the outdoor unit 200. However, when the operation of the outdoor unit 200 is stopped for defrosting, operation of the second air blower 109b may be stopped until the frost thaws. To remove moisture left after the frost thaws, the processor 193 may operate the second air blower 109b again.

Furthermore, based on the heat exchanger cleaning mode or the total heat exchanger drying mode, the processor 193 may close the first damper 330 to close the first intake 101a and open the second damper 340 to open the connection flow path 102b formed between the first intake 101a and the second intake 101c. The processor 193 may close or open the third damper 350 arranged at the second intake 101c.

When the ventilation system 1 operates in the heat exchanger cleaning mode, the air cooled by the heat exchangers 120 and 130 is forced to be discharged through the first outlet 101b and the fourth duct D4 connected to the outdoor space, thereby preventing the second duct D2 connected to the indoor space from being frosted.

When the ventilation system 1 operates in the total heat exchanger drying mode, the air heated by the heat exchangers 120 and 130 is forced to pass the total heat exchanger 110, circulate in the ventilator 100 and be discharged to the outdoor space through the first outlet 101b, thereby facilitating effective drying of the total heat exchanger 110. In addition, as the drying of the total heat exchanger 110 is performed bi-directionally, drying efficiency may be improved.

Figure 12:
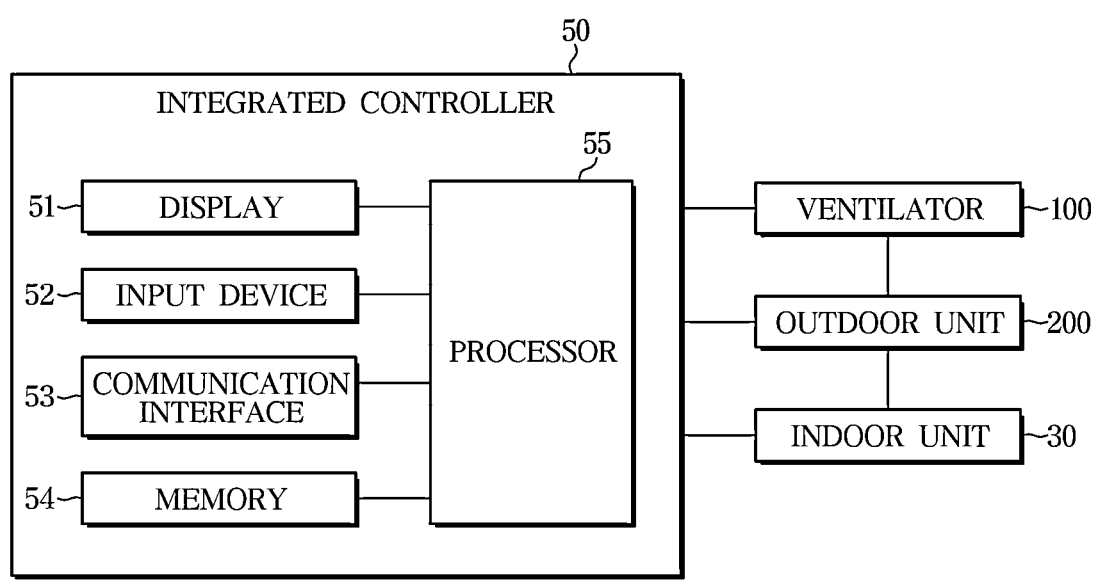
FIG. 12 is a control block diagram of an integrated controller, according to an embodiment.

FIG. 12 is a control block diagram of an integrated controller, according to an embodiment.

Referring to FIG. 12, the integrated controller 50 may include a display 51, an input device 52, a communication interface 53, a memory 54, and a processor 55 electrically connected to the components. The integrated controller 50 may provide a user interface for interactions between the integrated air conditioning system 2 and the user.

The display 51 may display information regarding a state and/or operation of the integrated air conditioning system 2. The display 51 may display information input by the user or information to be provided for the user in various screens. The display 51 may display information regarding an operation of the integrated air conditioning system 2 in at least one of an image or text. Furthermore, the display 51 may display a graphic user interface (GUI) that enables the integrated air conditioning system 2 to be controlled. Hence, the display 51 may display a user interface element (UI element) such as an icon.

The display 51 may include a display panel of various types. For example, the display device 54 may include a liquid crystal display (LCD) panel, a light emitting diode (LED) panel, an organic LED (OLED) panel, or a micro LED panel.

The display 51 may be implemented with a touch display. The touch display may include a display panel for displaying an image and a touch panel for receiving a touch input. The display panel may convert image data received from the processor 55 to an optical signal visible to the user. The touch panel may identify a touch input from the user and provide an electric signal corresponding to the received touch input to the processor 55.

The input device 52 of the integrated controller 50 may output an electric signal (voltage or current) corresponding to the user input to the processor 55. The input module 52 may include various buttons and even a dial. When the display 51 is provided as a touch display, the input device 52 may not be provided separately for the integrated controller 50. That is, the integrated controller 50 may obtain a user input. For example, the integrated controller 50 may obtain a user input to turn on or turn off each of the indoor unit 30 and the ventilator 100 or a user input to set an operation mode of each of the indoor unit 30 and the ventilator 100.

The communication interface 53 may perform communication with the ventilator 100, the outdoor unit 200 and the indoor unit 30. The communication interface 53 of the integrated controller 50 may be connected to a communication interface of each of the indoor unit 30, the ventilator 100, the outdoor unit 200 through the communication line (CL). The integrated controller 50 may transmit control signals to the ventilator 100, the outdoor unit 500 and the indoor unit 30 through the communication interface 53.

The communication interface 53 may include a wired communication module and/or a wireless communication module to communicate with an external device (e.g., a mobile device, a computer). The wired communication module may communicate with an external device over a wide area network such as the Internet, and the wireless communication module may communicate with an external device through an access point connected to a wide area network. With this, the user may remotely control the integrated air conditioning system 2.

The memory 54 may memorize/store various information required for operation of the integrated air conditioning system 2. The memory 54 may store instructions, an application, data and/or a program required for operation of the integrated air conditioning system 2. For example, the memory 54 may store data about reference temperature and reference humidity for determining operations of the ventilator 100 and the indoor unit 30.

The memory 54 may include a volatile memory for temporarily storing data, such as a static random access memory (SRAM), or a dynamic random access memory (DRAM). The memory 54 may also include a non-volatile memory for storing data for a long time, such as a read-only memory (ROM), an erasable programmable ROM (EPROM), or an electrically erasable programmable ROM (EEPROM).

The processor 55 may generate control signals for controlling operation of the integrated air conditioning system 2 based on the instructions, application, data and/or program stored in the memory 54. The processor 55 may include logic circuits and operation circuits in hardware. The processor 55 may process data according to the program and/or instructions provided from the memory 54 and generate a control signal based on the processing result. The memory 54 and the processor 55 may be implemented in one control circuit or in multiple circuits.

The components of the ventilator 100, the outdoor unit 200, the indoor unit 30 and the integrated controller 50 are not limited to the components as described above in connection with FIGS. 11 and 12. Some of the aforementioned components of each of the ventilator 100, the outdoor unit 200, the indoor unit 30 and the integrated controller 50 may be omitted, or other components may further be added.

Figure 13:
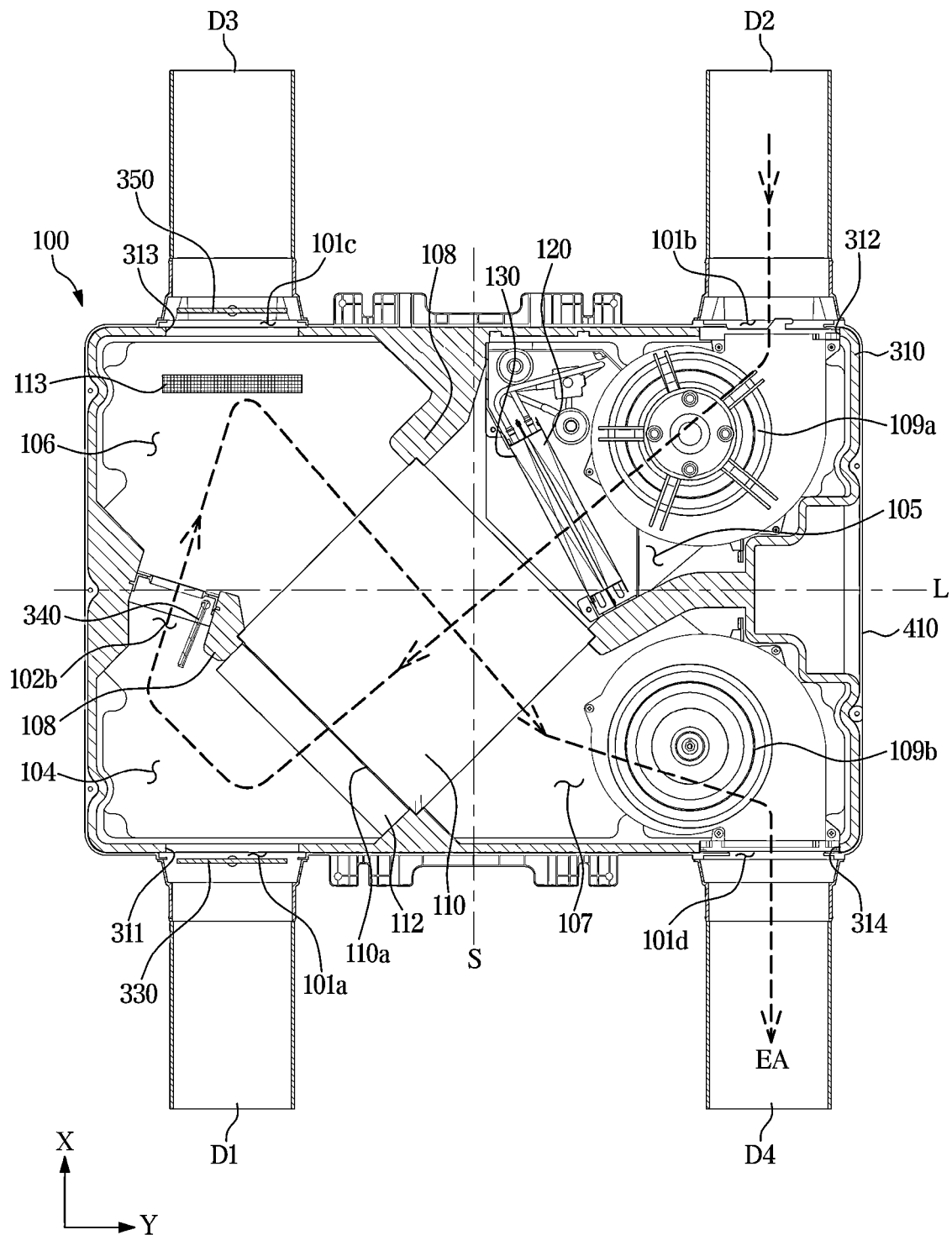
FIG. 13 illustrates an example of air flows formed inside a ventilator during an operation in a heat exchanger cleaning mode or a total heat exchanger drying mode.

FIG. 13 illustrates an example of air flows formed inside a ventilator during an operation in a heat exchanger cleaning mode or a total heat exchanger drying mode.

Referring to FIG. 13, the processor 193 of the ventilation system 1 may stop operating the first air blower 109a and operate the second air blower 109b based on execution of the heat exchanger cleaning mode or the total heat exchanger drying mode. The processor 193 of the ventilation system 1 may close the first damper 330 to close the first intake 101a and close the second damper 340 to open the connection flow path 102b. Furthermore, the processor 193 may close the third damper 350 to close the second intake 101c.

When the first damper 330 and the third damper 350 are closed and only the second air blower 109b operates, the room air is sucked into the housing 101 through the first outlet 101b, and the room air sucked in passes the heat exchangers 120 and 130, the total heat exchanger 110 and the connection flow path 102b in sequence, and flows into the first discharge room 106. The air flowing into the first discharge room 106 passes the total heat exchanger 110 again and is then discharged to the outdoor space through the second outlet 101d.

When the ventilation system 1 operates in the heat exchanger cleaning mode, the air cooled by the heat exchangers 120 and 130 flows to the first outlet 101b and the fourth duct D4 connected to the outdoor space, thereby preventing the second duct D2 connected to the indoor space from being frosted.

When the ventilation system 1 operates in the total heat exchanger drying mode, the air heated by the heat exchangers 120 and 130 passes the total heat exchanger 110, circulates in the ventilator 100 and is discharged to the outdoor space through the first outlet 101b, thereby facilitating effective drying of the total heat exchanger 110. In addition, as the drying of the total heat exchanger 110 is performed bi-directionally, drying efficiency may be improved.

Figure 14:
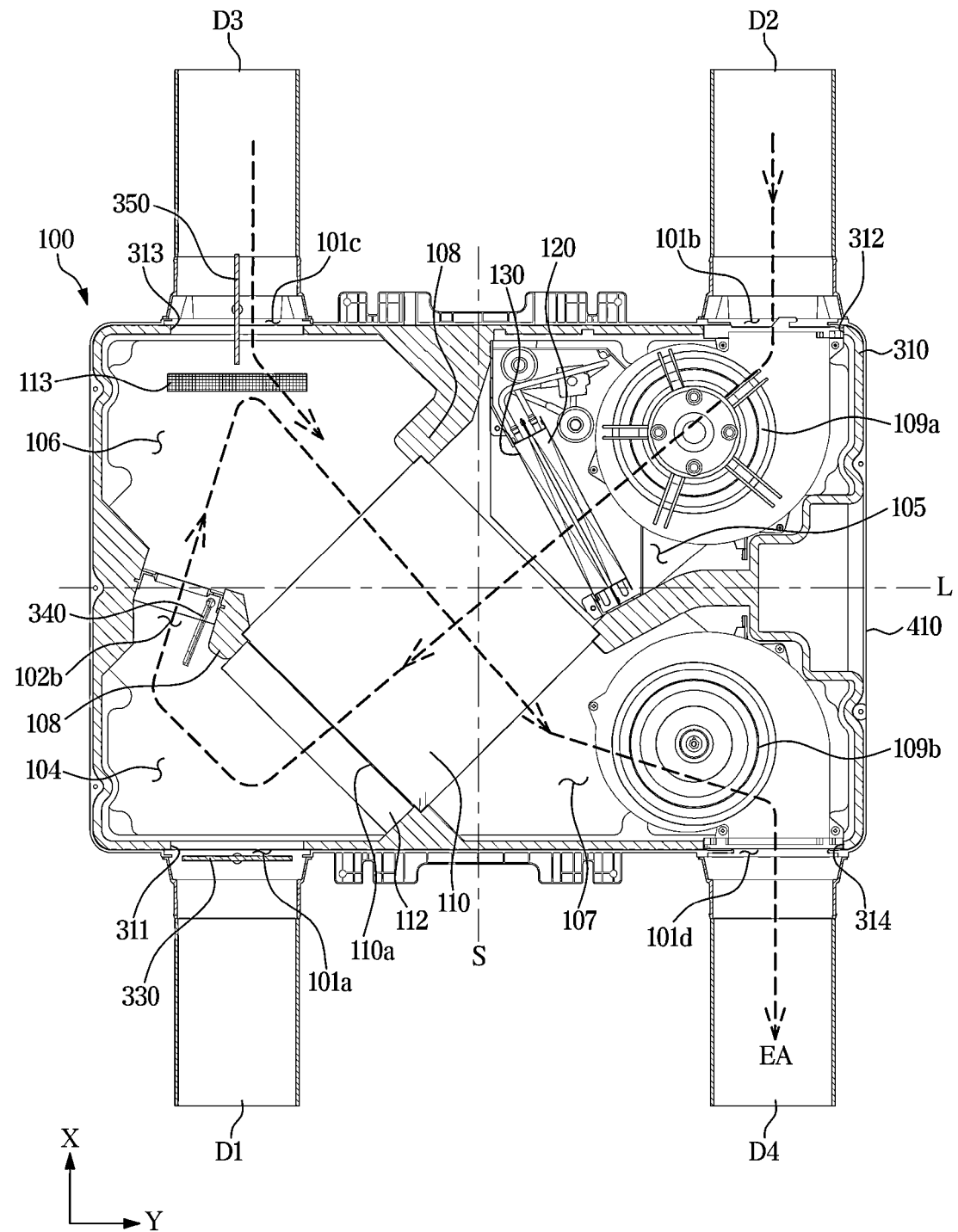
FIG. 14 illustrates another example of air flows formed inside a ventilator during an operation in a heat exchanger cleaning mode or a total heat exchanger drying mode.

FIG. 14 illustrates another example of air flows formed inside a ventilator during an operation in a heat exchanger cleaning mode or a total heat exchanger drying mode.

Referring to FIG. 14, the processor 193 of the ventilation system 1 may stop operating the first air blower 109a and operate the second air blower 109b. The processor 193 of the ventilation system 1 may close the first damper 330 to close the first intake 101a and close the second damper 340 to open the connection flow path 102b. Furthermore, the processor 193 may open the third damper 350.

When only the second air blower 109b operates while the first damper 330 is closed and the second damper 340 and the third damper 350 are opened, the room air may be sucked into the housing 101 through the first outlet 101b and the second intake 101c. The room air sucked in through the first outlet 101b passes the heat exchangers 120 and 130, the total heat exchanger 110 and the connection flow path 102b in sequence and flows into the first discharge room 106. The air flowing into the first discharge room 106 passes the total heat exchanger 110 again and is then discharged to the outdoor space through the second outlet 101d.

The room air sucked in through the second intake 101c passes the total heat exchanger 110 and is then discharged to the outdoor space through the second outlet 101d. As only the second air blower 109b operates, the room air may be sucked in through the first outlet 101b even when the third damper 350 is opened.

Figure 15:
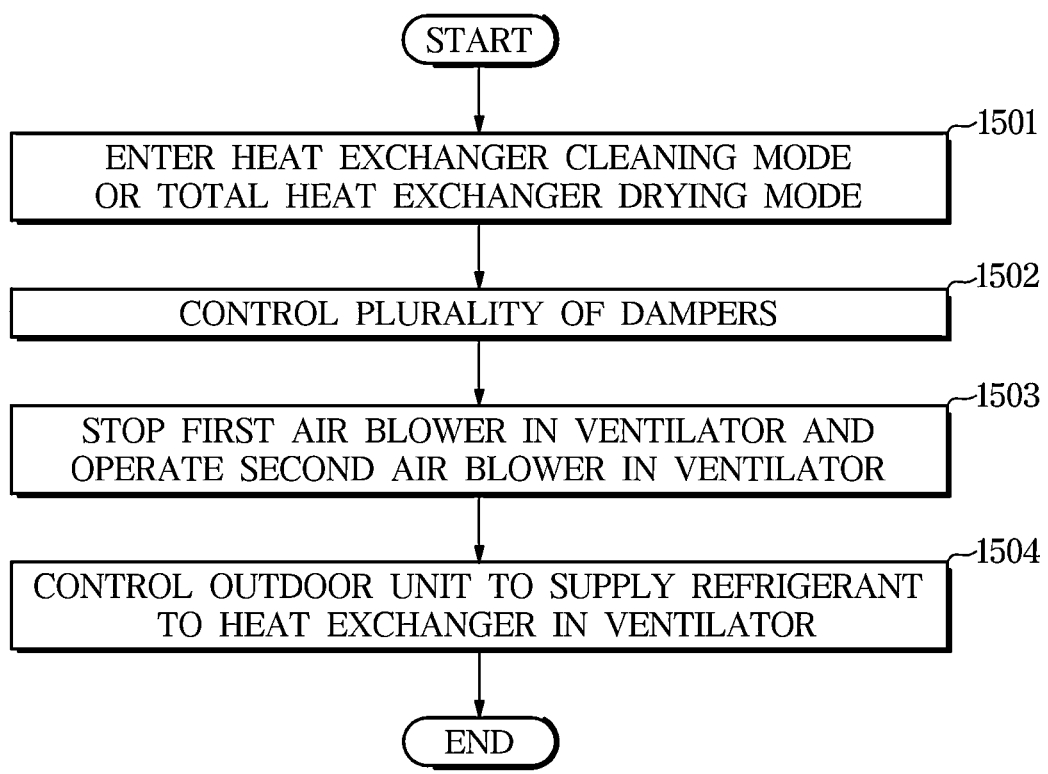
FIG. 15 is a flowchart describing a method of controlling a ventilation system, according to an embodiment.

FIG. 15 is a flowchart describing a method of controlling a ventilation system, according to an embodiment.

Referring to FIG. 15, the ventilation system 1 may enter and operate in the heat exchanger cleaning mode or the total heat exchanger drying mode. For example, the processor 193 may enter the heat exchanger cleaning mode or the total heat exchanger drying mode based on an accumulated operation time of the ventilation operation reaching a preset threshold time. Furthermore, the processor 193 may periodically enter the heat exchanger cleaning mode or the total heat exchanger drying mode based on a preset schedule. The processor 193 may operate the ventilator 100 and the outdoor unit 200 in the heat exchanger cleaning mode or the total heat exchanger drying mode based on a command obtained through the user interface 180. The processor 193 may enter the heat exchanger cleaning mode or the total heat exchanger drying mode after the ventilating operation of operating both the first air blower 109a and the second air blower 109b is completed.

The processor 193 may control the plurality of dampers arranged in the housing 101 based on the heat exchanger cleaning mode or the total heat exchanger drying mode so that the room air flows into the housing 101 through the first outlet 101b of the ventilator 100, passes the heat exchangers 120 and 130 and total heat exchanger 110 in sequence and is then discharged to the outdoor space through the second outlet, in 1502.

Furthermore, the processor 193 may stop the first air blower 109a of the ventilator 100 and operate the second air blower 109b based on the heat exchanger cleaning mode or the total heat exchanger drying mode, in 1503. The processor 193 may control the outdoor unit 200 to supply the refrigerant to the heat exchangers 120 and 130 based on the heat exchanger cleaning mode or the total heat exchanger drying mode, in 1504.

Figure 16:
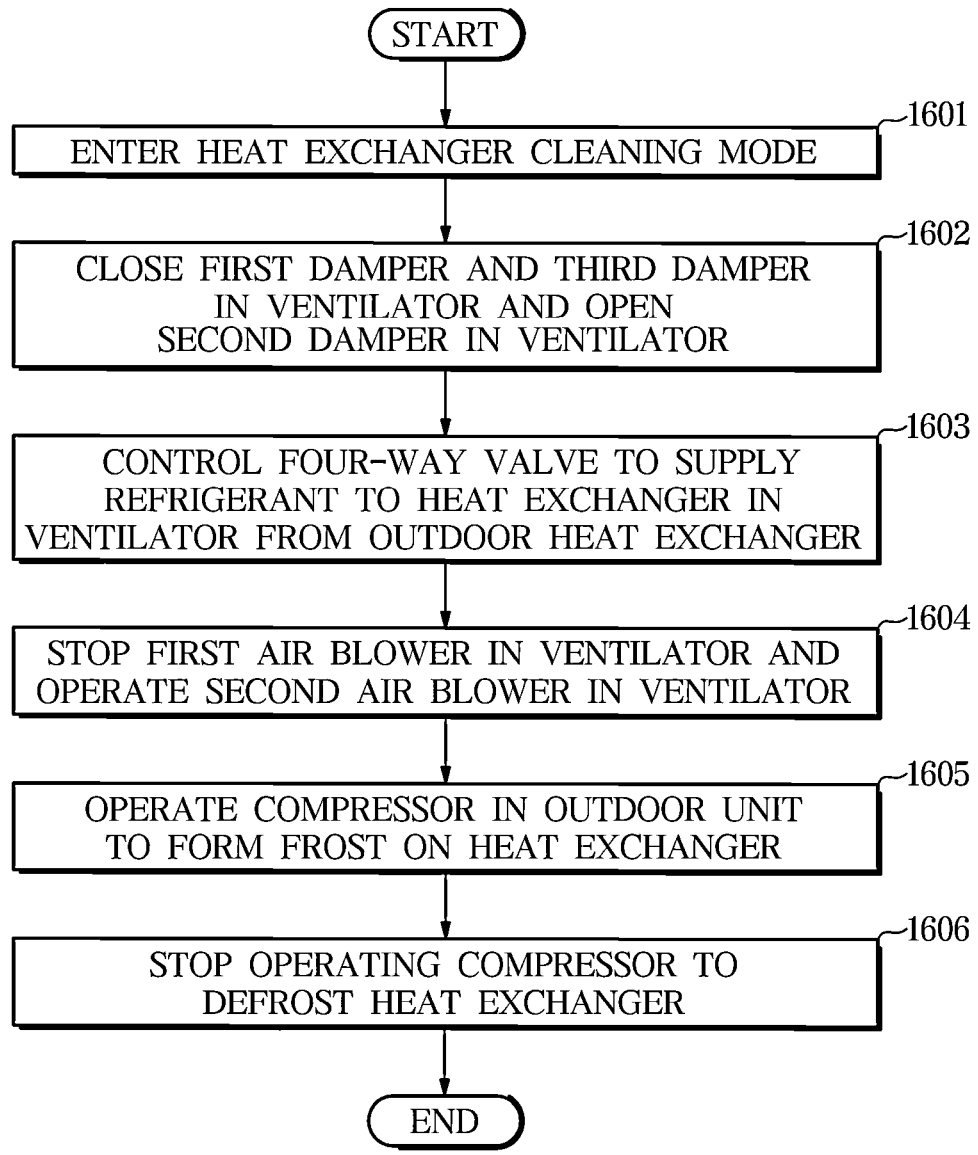
FIG. 16 is a flowchart describing a detailed control method when a ventilation system operates in a heat exchanger cleaning mode, according to an embodiment.

FIG. 16 is a flowchart describing a controlling method when a ventilation system operates in a heat exchanger cleaning mode, according to an embodiment.

Referring to FIG. 16, the ventilation system 1 may enter and operate in the heat exchanger cleaning mode, in 1601. The processor 193 may close the first damper 330 to close the first intake 101a and open the second damper 340 to open the connection flow path 102b formed between the first intake 101a and the second intake 101c in the heat exchanger cleaning mode, in 1602. The processor 193 may close or open the third damper 350 arranged at the second intake 101c.

The processor 193 may control the outdoor unit 200 to supply the refrigerant to the heat exchangers 120 and 130 from the outdoor heat exchanger 220 in the heat exchanger cleaning mode, in 1603. The processor 193 may control the first expansion device 160 in the ventilator 100 to expand the refrigerant. In an embodiment, the processor 193 may control the compressor 210 and the four-way valve 230 to supply the refrigerant to the heat exchangers 120 and 130 in the ventilator 100 after the refrigerant passes the outdoor heat exchanger 220 from the compressor 210 in the heat exchanger cleaning mode. In another embodiment, the outdoor unit 200 may not include the four-way valve 230.

The processor 193 may stop the first air blower 109a and operate the second air blower 109b, in 1604. The room air is sucked into the housing 101 through the first outlet 101b, and the room air sucked in passes the heat exchangers 120 and 130, the total heat exchanger 110 and the connection flow path 102b in sequence, and flows into the first discharge room 106. The air flowing into the first discharge room 106 may pass the total heat exchanger 110 again and may then be discharged to the outdoor space through the second outlet 101d.

The processor 193 may operate the outdoor unit 200 to form frost on the heat exchangers 120 and 130 in the heat exchanger cleaning mode, in 1605. The processor 193 may operate the second air blower 109b while operating the outdoor unit 200 in the heat exchanger cleaning mode. In the heat exchanger cleaning mode, to form frost on the heat exchangers 120 and 130, air needs to be constantly supplied to the heat exchangers 120 and 130 during operation of the outdoor unit 200.

The processor 193 may stop operating the outdoor unit 200 to defrost the heat exchangers 120 and 130, in 1606. The processor 193 may determine to stop operating the outdoor unit 200 based on a temperature measured by the heat exchanger temperature sensor 144 being lower than a preset threshold temperature. Alternatively, the processor 193 may determine to stop operating the outdoor unit 200 based on the operation time of the outdoor unit 200 reaching the preset limit time after entering the heat exchanger cleaning mode.

The processor 193 may operate the second air blower 109b until the heat exchanger cleaning operation is completed. Furthermore, the processor 193 may stop the second air blower 109b for a preset period of time in response to the termination of operation of the outdoor unit 200 and then operate the second blower 109b again.

When the ventilation system 1 operates in the heat exchanger cleaning mode, the air cooled by the heat exchangers 120 and 130 is forced to be discharged through the first outlet 101b and the fourth duct D4 connected to the outdoor space, thereby preventing the second duct D2 connected to the indoor space from being frosted.

Figure 17:
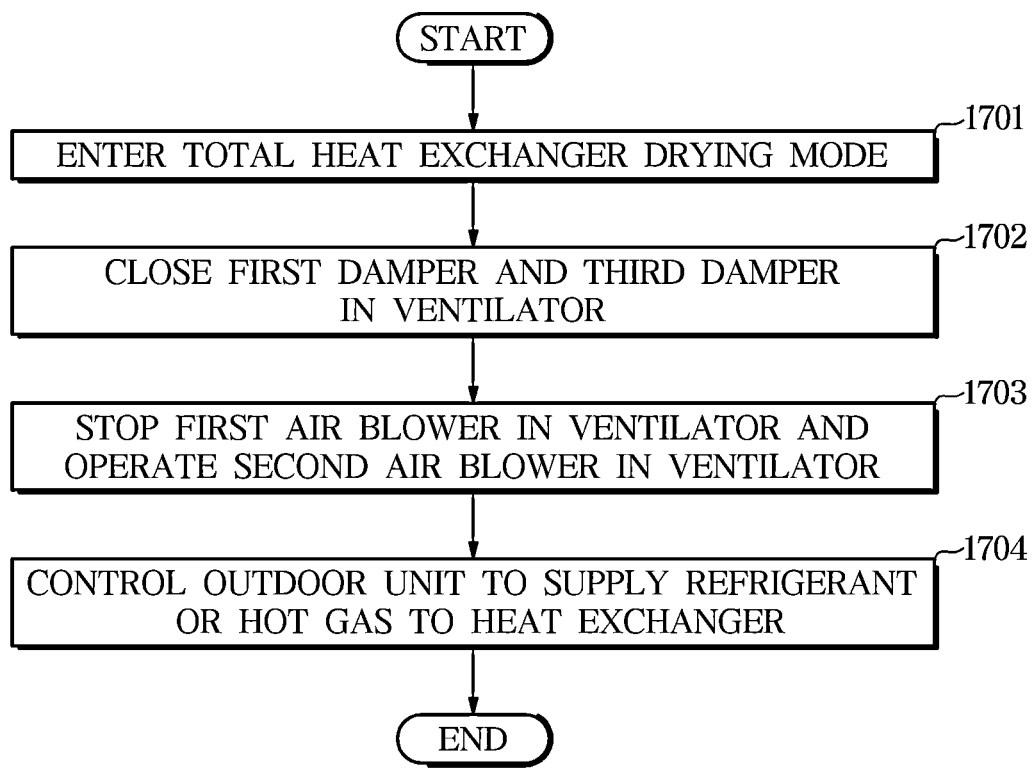
FIG. 17 is a flowchart describing a detailed control method when a ventilation system operates in a total heat exchanger drying mode, according to an embodiment.

FIG. 17 is a flowchart describing a detailed control method when a ventilation system operates in a total heat exchanger drying mode, according to an embodiment.

Referring to FIG. 17, the ventilation system 1 may enter and operate in the total heat exchanger drying mode, in 1701. The processor 193 may close the first damper 330 to close the first intake 101a and open the second damper 340 to open the connection flow path 102b formed between the first intake 101a and the second intake 101c in the total heat exchanger drying mode, in 1702. The processor 193 may close or open the third damper 350 arranged at the second intake 101c.

Furthermore, the processor 193 may stop the first air blower 109a and operate the second air blower 109b, in 1703. The room air is sucked into the housing 101 through the first outlet 101b, and the room air sucked in passes the heat exchangers 120 and 130, the total heat exchanger 110 and the connection flow path 102b in sequence, and flows into the first discharge room 106. The air flowing into the first discharge room 106 may pass the total heat exchanger 110 again and may then be discharged to the outdoor space through the second outlet 101d.

The processor 193 may control the outdoor unit 200 to supply the refrigerant or hot gas to the heat exchangers 120 and 130 in the ventilator 100 from the compressor 220 in the total heat exchanger drying mode, in 1704. In an embodiment, the processor 193 may control the compressor 210 and the four-way valve 230 to supply the refrigerant to the outdoor heat exchanger 220 after the refrigerant passes the heat exchangers 120 and 130 in the ventilator 100 from the compressor 210 in the total heat exchanger drying mode. In another embodiment, the processor 193 may close the first expansion device 160 and open the first hot gas valve 241 and the second hot gas valve 242 to heat the air passing the heat exchangers 120 and 130 by using a hot gas discharged from the compressor 210 in the total heat exchanger drying mode.

When the ventilation system 1 operates in the total heat exchanger drying mode, the air heated by the heat exchangers 120 and 130 is forced to pass the total heat exchanger 110, circulate in the ventilator 100 and be discharged to the outdoor space through the first outlet 101b, thereby facilitating effective drying of the total heat exchanger 110. In addition, as the drying of the total heat exchanger 110 is performed bi-directionally, drying efficiency may be improved.

As described above, the ventilation system and method for controlling the same as disclosed herein may clean heat exchangers arranged in the ventilator by changing air flow paths and clean the heat exchangers without frosting on an outlet of the ventilator. This may keep not only the inside of the ventilator but also the outlet of the ventilator clean.

The ventilation system and method for controlling the same may also efficiently dry a total heat exchanger arranged in the ventilator. This may prevent the total heat exchanger from going moldy, expand a lifespan of the total heat exchanger, and improve quality of air supplied to an indoor space.

Meanwhile, the embodiments of the disclosure may be implemented in the form of a storage medium for storing instructions to be carried out by a computer. The instructions may be stored in the form of program codes, and when executed by a processor, may generate program modules to perform operation in the embodiments of the disclosure.

The machine-readable storage medium may be provided in the form of a non-transitory storage medium. The term 'non-transitory storage medium' may mean a tangible device without including a signal, e.g., electromagnetic waves, and may not distinguish between storing data in the storage medium semi-permanently and temporarily. For example, the non-transitory storage medium may include a buffer that temporarily stores data.

The aforementioned methods according to the various embodiments of the disclosure may be provided in a computer program product. The computer program product may be a commercial product that may be traded between a seller and a buyer. The computer program product may be distributed in the form of a storage medium (e.g., a compact disc read only memory (CD-ROM)), through an application store (e.g., Play Store™), directly between two user devices (e.g., smart phones), or online (e.g., downloaded or uploaded). In the case of online distribution, at least part of the computer program product (e.g., a downloadable app) may be at least temporarily stored or arbitrarily created in a storage medium that may be readable to a device such as a server of the manufacturer, a server of the application store, or a relay server.

The embodiments of the disclosure have thus far been described with reference to accompanying drawings. It will be obvious to those of ordinary skill in the art that the disclosure may be practiced in other forms than the embodiments as described above without changing the technical idea or essential features of the disclosure. The above embodiments are only by way of example, and should not be construed in a limited sense.

What is claimed is:

1. A ventilation system comprising:
a ventilator comprising:
a housing including a first intake, a second intake, a first outlet and a second outlet,
a plurality of dampers configured to change an air flow path of air flowing through the housing,
a first air blower,
a second air blower,
a total heat exchanger inside the housing, and
a heat exchanger inside the housing; and
a processor configured to control the first air blower, the second air blower, and the plurality of dampers to change the air flow path of air flowing through the housing so as to provide:
a ventilation mode in which:
an intake flow path is provided in which the first air blower causes air from a space outside a room to enter the housing through the first intake, thereafter pass through the total heat exchanger, thereafter pass through the heat exchanger, and thereafter be discharged into the room through the first outlet, and
a discharge flow path is provided in which the second air blower causes air from the room to enter the housing through the second intake, thereafter pass through the total heat exchanger, and thereafter be discharged to the space outside the room through the second outlet, without passing through the heat exchanger, and
at least one of a heat exchanger cleaning mode and a total heat exchanger drying mode, in which
the first air blower is stopped, and the second air blower and the plurality of dampers are operated to cause air in the room to flow into the housing through the first outlet, thereafter pass through the heat exchanger, thereafter pass through the total heat exchanger, and thereafter be discharged to the space outside the room through the second outlet.

2. The ventilation system of claim 1, wherein the plurality of dampers comprises:
a first damper configured to open and close the first intake, and
a second damper configured to open and close a connection flow path between the first intake and the second intake,
wherein the processor is configured to provide the at least one of the heat exchanger cleaning mode and the total heat exchanger drying mode by:
controlling the first damper to close the first intake, and
controlling the second damper to open the connection flow path between the first intake and the second intake.

3. The ventilation system of claim 2, wherein the plurality of dampers further comprises:
a third damper configured to open and close the second intake,
wherein the processor is configured to provide the at least one of the heat exchanger cleaning mode and the total heat exchanger drying mode, by:
controlling the third damper to close the second intake.

4. The ventilation system of claim 1, further comprising:
an outdoor unit configured to supply a refrigerant to the ventilator,
wherein the processor is configured to provide the heat exchanger cleaning mode by:
operating the outdoor unit to form frost on the heat exchanger, and,
after the frost is formed on the heat exchanger, stopping the outdoor unit to defrost the heat exchanger.

5. The ventilation system of claim 4, wherein the outdoor unit comprises:
an outdoor heat exchanger,
a compressor configured to compress the refrigerant,
a four-way valve configured to switch a circulation direction of the refrigerant, and
wherein the processor is configured to, in the heat exchanger cleaning mode, control the compressor and the four-way valve to allow the refrigerant to pass from the compressor to the outdoor heat exchanger and to be supplied to the heat exchanger in the ventilator.

6. The ventilation system of claim 4, wherein the outdoor unit comprises:
an outdoor heat exchanger,
a compressor configured to compress the refrigerant, and
a four-way valve configured to switch a circulation direction of the refrigerant, and
wherein the processor is configured to, while operating in the total heat exchanger drying mode, control the compressor and the four-way valve to allow the refrigerant to pass from the compressor to the heat exchanger in the ventilator and to be supplied to the outdoor heat exchanger.

7. The ventilation system of claim 4, wherein the processor is configured to, in the total heat exchanger drying mode:
control the outdoor unit to allow a hot gas discharged from the compressor to be supplied to the heat exchanger through a hot gas line.

8. The ventilation system of claim 1, wherein the processor is configured to:
in the ventilation mode, operate the first air blower and the second air blower, and
after the operation of the first air blower and the second air blower is completed, operate the ventilation system in the at least one of the heat exchanger cleaning mode and the total heat exchanger drying mode.

9. The ventilation system of claim 8, wherein the processor is configured to:
in the ventilation mode, operate the first air blower and the second air blower for a preset threshold time, and thereafter operate the ventilation system in the heat exchanger cleaning mode.

10. The ventilation system of claim 4, wherein the processor is configured to:
periodically operate the ventilator and the outdoor unit in the total heat exchanger mode based on a preset schedule.

11. A method of controlling a ventilation system including a ventilator having a housing that includes a first intake, a second intake, a first outlet, and a second outlet, a plurality of dampers configured to change an air flow path of air flowing through the housing, a first air blower, a second air blower, a total heat exchanger inside the housing, a heat exchanger inside the housing, and a processor, the method comprising, by the processor:
controlling the first air blower, the second air blower, and the plurality of dampers to change the air flow path of air flowing through the housing so as to provide:
a ventilation mode in which:
an intake flow path is provided in which the first air blower causes air from a space outside a room to enter the housing through the first intake, thereafter pass through the total heat exchanger, thereafter pass through the heat exchanger, and thereafter be discharged into the room through the first outlet, and
a discharge flow path is provided in which the second air blower causes air from the room to enter the housing through the second intake, thereafter pass through the total heat exchanger, and thereafter be discharged to the space outside the room through the second outlet, without passing through the heat exchanger, and
at least one of a heat exchanger cleaning mode and a total heat exchanger drying mode, in which
the first air blower is stopped, and the second air blower and the plurality of dampers are operated to cause air in the room to flow into the housing through the first outlet, thereafter pass through the heat exchanger, thereafter pass through the total heat exchanger, and thereafter be discharged to the space outside the room through the second outlet.

12. The method of claim 11, wherein:
the plurality of dampers includes a first damper configured to open and close the first intake and a second damper configured to open and close a connection flow path between the first intake and the second intake, and,
in the at least one of the heat exchanger cleaning mode and the total heat exchanger drying mode, the first damper is controlled to close the first intake, and the second damper is controlled to open the connection flow path.

13. The method of claim 12, wherein:
the plurality of dampers includes a third damper configured to open and close the second intake, and,
in the at least one of the heat exchanger cleaning mode and the total heat exchanger drying mode, the third damper is controlled to close the second intake.

14. The method of claim 11, wherein:
the ventilation system includes an outdoor unit configured to supply a refrigerant to the ventilator, and,
in the heat exchanger cleaning mode, the outdoor unit is operated to form frost on the heat exchanger, and, after the frost is formed on the heat exchanger, the outdoor unit is stopped to defrost the heat exchanger.

15. The method of claim 14, wherein:
the ventilation system includes a four-way valve, and,
in the heat exchanger cleaning mode, a compressor in the outdoor unit and the four-way valve are controlled to allow the refrigerant in the compressor to pass an outdoor heat exchanger in the outdoor unit, and thereafter be supplied to the heat exchanger in the ventilator.

* * * * *